(12) United States Patent
Traidia et al.

(10) Patent No.: US 10,990,873 B2
(45) Date of Patent: Apr. 27, 2021

(54) SYSTEMS AND METHODS FOR RAPID PREDICTION OF HYDROGEN-INDUCED CRACKING (HIC) IN PIPELINES, PRESSURE VESSELS, AND PIPING SYSTEMS AND FOR TAKING ACTION IN RELATION THERETO

(71) Applicant: Saudi Arabian Oil Company, Dhahran (SA)

(72) Inventors: Abderrazak Traidia, Abqaiq (SA); Abdelmounam Sherik, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 970 days.

(21) Appl. No.: 15/630,428

(22) Filed: Jun. 22, 2017

(65) Prior Publication Data
US 2017/0372196 A1    Dec. 28, 2017

Related U.S. Application Data

(60) Provisional application No. 62/353,406, filed on Jun. 22, 2016.

(51) Int. Cl.
*G05B 17/02*   (2006.01)
*G06F 30/20*   (2020.01)
(Continued)

(52) U.S. Cl.
CPC .......... *G06N 3/0427* (2013.01); *G05B 17/02* (2013.01); *G05B 23/0245* (2013.01);
(Continued)

(58) Field of Classification Search
CPC combination set(s) only.
See application file for complete search history.

(56) References Cited

U.S. PATENT DOCUMENTS 4,336,595 A   6/1982   Adams et al.
5,025,392 A   6/1991   Singh
(Continued)

FOREIGN PATENT DOCUMENTS

CN   102103646 B   11/2012
CN   103870662 A    6/2014
(Continued)

OTHER PUBLICATIONS

Jiangbo Shi, et al., "Prediction of crack growth rate in Type 304 stainless steel using artificial neural networks and the coupled environment fracture model," Corrosion Science 89 pp. 69-80 (Year: 2014).*

(Continued)

*Primary Examiner* — Rehana Perveen
*Assistant Examiner* — Steven W Crabb
(74) *Attorney, Agent, or Firm* — Leason Ellis LLP

(57) ABSTRACT

Methods and systems of predicting the growth rate of hydrogen-induced cracking (HIC) in a physical asset (e.g., a pipeline, storage tank, etc.) are provided. The methodology receives a plurality of inputs regarding physical characteristics of the asset and performs parametric simulations to generate a simulated database of observations of the asset. The database is then used to train, test, and validate one or more expert systems that can then predict the growth rate and other characteristics of the asset over time. The systems herein can also generate alerts as to predicted dangerous conditions and modify inspection schedules based on such growth rate predictions.

10 Claims, 11 Drawing Sheets

(51) Int. Cl.
G06N 3/08 (2006.01)
G06F 111/10 (2020.01)
G06N 3/04 (2006.01)
G05B 23/02 (2006.01)

(52) U.S. Cl.
CPC ......... *G05B 23/0254* (2013.01); *G06F 30/20* (2020.01); *G06N 3/08* (2013.01); *G06F 2111/10* (2020.01)

(56) References Cited

U.S. PATENT DOCUMENTS

| | | | |
|---|---|---|---|
| 6,567,752 B2 | 5/2003 | Cusumano et al. | |
| 6,609,036 B1 | 8/2003 | Bickford | |
| 7,013,224 B2 | 3/2006 | Landry et al. | |
| 7,043,373 B2 | 5/2006 | Pittawala et al. | |
| 7,536,277 B2 | 5/2009 | Pattipatti et al. | |
| 7,933,679 B1 | 4/2011 | Kulkarni et al. | |
| 8,065,244 B2 | 11/2011 | Chen et al. | |
| 8,190,378 B2 | 5/2012 | Sakai et al. | |
| 8,494,827 B2 | 7/2013 | Mutlu et al. | |
| 8,499,643 B2 | 8/2013 | Brown et al. | |
| 8,725,456 B1 | 5/2014 | Saha et al. | |
| 8,855,852 B2 | 10/2014 | Armijo Torres et al. | |
| 2006/0219011 A1* | 10/2006 | Siddu ................ | G01N 29/11 73/597 |
| 2007/0068605 A1 | 3/2007 | Statnikov | |
| 2008/0177516 A1* | 7/2008 | Vasudevan ............ | G07C 3/14 703/2 |
| 2011/0054840 A1 | 3/2011 | Hively et al. | |
| 2012/0209538 A1 | 8/2012 | Caicedo et al. | |
| 2013/0090902 A1 | 4/2013 | Yao et al. | |
| 2013/0191039 A1 | 7/2013 | Guan et al. | |
| 2015/0213166 A1 | 7/2015 | Mills | |

FOREIGN PATENT DOCUMENTS

| | | | | |
|---|---|---|---|---|
| CN | 104204769 A | 12/2014 | | |
| WO | 2001020299 A2 | 3/2001 | | |
| WO | 2012100044 A1 | 7/2012 | | |
| WO | WO-2012100044 A1 * | 7/2012 | ............ | E21B 34/02 |

OTHER PUBLICATIONS

Extended European Search Report in Corresponding European Patent Application No. 20167593.1 dated May 18, 2020. 7 pages.
"Traidia A, Sherik et al. "An effective finite element model for he prediction of hydrogen induced cracking insteel pipelines. International Journal of Hydrogen Energy. 37; 2012: pp. 16214-16230.
API standard 579-1/ASME FFS-1. Fitness-For-Service standard, "Part 7—Assessment of Hydrogen Blisters and Hydrogen Damage Associated with HIC and SOHIC" 36 pages.
COMSOL Multiphysics v4.2. "COMSOL Multiphysics Release Notes," May 2011, 48 pages.
MATLAB Neural Network Toolbox. www.mathworks.com/products/neural-network/. Accessed Mar. 23, 2017. 3 pages.
MATLAB Compiler. www.mathworks.com/products/compiler/. Accessed Apr. 15, 2020, 6 pages.
Brouwer et al. Modeling hydrogen-induced crack growth: validation by comparison with experiment. Corrosion, vol. 95. NACE International; 1995. 30 pages.
Brouwer, R.C. et al. Modeling hydrogen induced crack growth in the wall of pipelines and pressure vessels. Proceedings of ECF, vol. 10; 10 pages, 1994. pp. 649-658.
Krom et al. Modeling hydrogen-induced cracking in steel using a coupled diffusion stress finite element analysis. Int. J. Press. Vessels & Piping, 1997. 72(2): pp. 139-147.
J. L. Gonzalez et al. Hydrogen-Induced Crack Growth Rate in Steel Plates Exposed to Sour Environments. Corrosion journal, 53:12, 1997. 9 pages. pp. 935-943.
R. V. Goldshtein, et al. Development of disk-shaped lamination in steel sheet under the action of tension and hydrogen impregnation. Materials Science, 21:pp. 493-498, 1985.
V. Kharin. Hydrogen induced underclad cracking in hydro-treating reactor pressure vessels. International Symposium on Materials Ageing and Component Life Extension, vol. 2, 6c, pp. 893-902, 1995.
T. Hara et al. The condition of HIC occurrence of x65 linepipe in wet H2S environments. Corrosion,14 pages, 1999.
J. L. Gonzalez et al. Hydrogen induced crack growth rates in steel plates under uniaxial stress. ICF 10, Italy. 7 pages.
Umbrello, D., et al. "A hybrid finite element method—artificial neural network approach for predicting residual stresses and the optimal cutting conditions during hard turning of AISI 52100 bearing steel." Materials & Design 29.4 (2008): pp. 873-883.
Bhise, Onkar Pradeeprao, and Dilip Kumar Pratihar. "Neural network-based expert system to predict the results of finite element analysis." Applications of Soft Computing. Springer, Berlin, Heidelberg, 2006. pp. 231-240.
Alvaro, Antonio, Vigdis Olden, and Odd Magne Akselsen. "3D cohesive modelling of hydrogen embrittlement in the heat affected zone of an X70 pipeline steel." International Journal of Hydrogen Energy 38.5 (2013): pp. 7539-7549.
Olden, Vigdis, et al. "Application of hydrogen influenced cohesive laws in the prediction of hydrogen induced stress cracking in 25% Cr duplex stainless steel." Engineering Fracture Mechanics 75.8 (2008): pp. 2333-2351.
Olden, Vigdis, C. Thaulow, and R. Johnsen. "Modelling of hydrogen diffusion and hydrogen induced cracking in supermartensitic and duplex stainless steels." Materials & design 29.10 (2008): pp. 1934-1948.
Suárez, V. J. C., et al. "Finite element analysis of the interaction of hydrogen induced stepwise cracks." ECF13 San Sebastian (2000). 8 pages.
Wintle, J.B. Which procedures for fitness-for-service assessment: API 579 or BS 7910? in International Conference on Pressure Vessel Technology. 2003. Vienna, Austria. 14 pages.
Olden, V., et al., Cohesive zone modeling of hydrogen-induced stress cracking in 25% Cr duplex stainless steel. Scripta Materialia, 2007. 57(7): pp. 615-618.
Standard, A., Standard test method for measurement of fracture toughness. ASTM, E1820-01, 2001:46 pages.
GitHub. OpenAN—An Open source library for artificial neural networks.; Available from: https://github.com/OpenANN.
Anderson, T.L., Fracture Mechanics: Fundamentals and Applications, Third Edition. 2005: Taylor & Francis. 630 pages.
Littmarck, S., "Modeling and Simulation for Everyone." COMSOL Multiphysics® Modeling Software., Copyright 2015. Web. <www.comsol.com/>. Jan. 2015.
International Search Report and Written Opinion of the International Searching Authority for corresponding international application PCT/US2017/038774, dated Oct. 2, 2017, 10 pages.
Alvaro, Antonio, Vigdis Olden, and Odd Magne Akselsen. "3D cohesive modelling of hydrogen embrittlement in the heat affected zone of an X70 pipeline steel—Part II." International Journal of Hydrogen Energy 39.7 (2014): pp. 3528-3541.
Shi, Jiangbo et al., "Prediction of crack growth rate in Type 304 stainless steel using artificial neural networks and the coupled environment fracture model." Corrosion science 89 (2014): 69-80.
Korean Office Action in Corresponding Korean Application No. 10-2018-7034435 dated Feb. 24, 2021. 18 pages..

* cited by examiner

US 10,990,873 B2

SYSTEMS AND METHODS FOR RAPID PREDICTION OF HYDROGEN-INDUCED CRACKING (HIC) IN PIPELINES, PRESSURE VESSELS, AND PIPING SYSTEMS AND FOR TAKING ACTION IN RELATION THERETO

CROSS REFERENCE TO RELATED APPLICATION

The present application claims priority to U.S. patent application Ser. No. 62/353,406, filed Jun. 22, 2016, which is hereby incorporated by reference in its entirety.

FIELD OF THE INVENTION

The present invention relates to assessing equipment damage to metal pipelines, in particular, to the assessment of hydrogen-induced damage to metal pipelines. More particularly, the present invention relates to rapid, robust and easy-to-use expert mechanistic model systems able to predict hydrogen-induced crack (HIC) growth rate and corresponding field-deployable numerical tools and for taking action in relation to such predictions.

BACKGROUND OF THE INVENTION

Hydrogen-induced cracking (HIC) is a persistent problem for pipelines, particularly those that are composed of non-HIC resistant steel and service sour gas (e.g., $H_2S$) or natural gas. In general terms, HIC refers to internal cracks that can develop in metal (e.g., steel) pipes, pressure vessels, and other piping systems, as a result of atomic hydrogen being dissolved in the metal. More specifically, hydrogen atoms can diffuse through the interstitial sites in the metal, and recombine to form high-pressure hydrogen gas within the metal. As the pressure of the hydrogen gas increases, blisters and microcracks can form (and subsequently grow) in the metal pipe. These blisters and cracks, as they continue to grow, can result the failure of the metal pipeline.

For plant vessels, unless the HIC damage is very severe (which would require immediate replacement), one current practice is to extend the lifetime of these assets by de-rating the vessel to a lower maximum allowable operating pressure (MAOP) and introducing a special monitoring program in parallel to the standard tests and inspection cycle. This special monitoring program relies upon engineer judgment in order to make recommendations as to when vessels with linear or stepwise cracking HIC damage require monitoring by advanced ultrasonic testing techniques (e.g., phased arrays). Typically, linear damage is monitored annually, and stepwise cracking damage is monitored semi-annually. Unfortunately, inspections require large amounts of equipment, require the availability of at least two historical-inspection records (separate in time), are very costly, and may even be impossible for buried lines. The frequency of inspections cannot be further reduced due to current Fitness for Service Standards (e.g., API 579-1/ASME FFS-1) used by the refining and petrochemical industry to evaluate the structural integrity of equipment containing flaws or damage, and to define (or re-define) safe operating parameters. Despite these standards, there is a lack of reliable and robust tools that can predict the growth rate (i.e., propagation rate) of HIC damage in a given metallic structure operating at given operating conditions. Predicting the growth rate of HIC damage can significantly improve decision-making for fitness for service (FFS) assessments. In particular, knowing the growth rate of pre-existing cracks makes it possible to estimate the remaining lifetime before breakage, under FFS conditions.

Further, current historical-based techniques are yet to be automated and can only be implemented manually (due to the requirements for skilled inspectors) on local spots to check suspect regions in damaged equipment. Unfortunately, a complete advanced ultrasonic testing mapping of a whole pressure vessel or pipeline is costly (both financially and in terms of high/excessive computing time—CPU usage, computer memory) and thus is not typically done in practice.

Presently, there is no standard method to determine the remaining lifetime of HIC-affected equipment. The output of the FFS assessment is a pass/fail result. Part 7.2.1 of API-579, which is devoted to the assessment of hydrogen blisters and hydrogen damage associated with HIC and stress-oriented hydrogen induced cracking (SOHIC), states that "at the present time, there is no widely accepted method to predict the growth rate of active HIC damage; therefore, a standard method to assess the remaining life of a damaged structure cannot be established. Therefore . . . periodic monitoring is required."

A practical and reliable methodology is needed to determine the growth rate of hydrogen induced damage, given drawbacks in practical field operations. Present attempts to estimate the growth rate of HIC cracking are unsuitable for practical deployment of such technology, for example, due to computer resource limitations (e.g., CPU time, memory use, etc.), unacceptable computing time for large scale simulations (e.g., when producing an accurate model in the field when there are hundreds or thousands of cracks), poor simulation convergence issues, inability to generate complete ultrasonic testing maps, and skills limitations (e.g., lack of workstations, licenses, trainings, certifications).

It is in regard to these issues and others that the present invention is provided.

SUMMARY OF THE INVENTION

According to a broad aspect of the systems and methods described herein, a method is provided for carrying out fitness-for-service assessments for a region of an asset having a growth rate of hydrogen induced damage in an asset by simulating the growth rate based on one or more data inputs. In a correspondingly broad aspect, such systems and methods can take one or more actions in relation to the assessments.

In accordance with one or more implementations described herein, the method includes inputting one or more first data inputs stored in a database to a mechanistic model. For example, the one or more inputs can be crack geometry data, crack location data, material properties data, hydrogen charging conditions data, or a combination thereof. The one or more data inputs are then processed in one or more parametric simulations by a processor executing the mechanistic model, to output one or more growth characteristics. For example, the processing of the one or more data inputs includes selecting, by the processor, one of the one or more data inputs to vary within a range and selecting, by the processor, each of the remaining one or more data inputs to be held constant. In another example, the processing of the one or more data inputs includes performing a design-of-experiment to identify the one or more data inputs to be held constant.

Further, the method builds a simulated observation database that stores the output one or more growth characteristics. For example, the one or more growth characteristics can include a time to initiation (τ), a crack growth rate (CGR), or a combination thereof. Next, an expert system is trained and tested by the simulated observation database. In one or more implementations, the expert system is trained and tested by splitting the expert system into a plurality of expert sub-systems, in which a first expert sub-system predicts crack growth having a conditional output, and in which a second expert sub-system predicts one or more growth characteristics. The method then validates the expert system by the simulated observation database. The method then outputs, by the expert system, the growth rate of hydrogen induced damage in the asset. In one or more implementations, where the growth rate of hydrogen induced damage exceeds a threshold, the method can generate an alert and transmit the alert to at least one robotic inspection device. In one example, the alert includes asset location information representing a region of the asset having the growth rate of hydrogen induced damage and further including transmitting to a robotic inspection device, the alert to instruct the robotic inspection device to locate the region, travel to the region, and perform a fitness-for-service assessment at the region. In one or more implementations, the method includes generating a schedule for a fitness-for-service inspection by the at least one robotic device, in which the schedule is generated as a function of the predicted growth rate.

In accordance with one or more implementations herein, the method further includes gathering one or more second data inputs by one or more data gathering devices. For example, the one or more second field data inputs is fracture toughness $K_{IH}$. The one or more second field data inputs are then input to the simulated observation database and the simulated observation database is updated. Thereafter, the expert system is tested with the updated simulated observation database for field validity, and the expert system is re-trained if the field validity of the expert system falls below a threshold.

In accordance with another aspect of the present disclosure, a method for training an expert system for predicting hydrogen induced crack growth rate from a simulated observation database (SODB) having one or more crack growth rate (CGR) observations is provided. The method includes applying one or more filters to the SODB to remove one or more CGR observations in which crack growth did not take place from the SODB. The method continues by copying the one or more CGR observations in which crack growth took place to a new database. Further, the new database is split into one or more predictors corresponding to $[X]^{CGC}=[g_i, l_i, m_i, o_i, h_i]_{i=1...M}$ and one or more targets corresponding to $[Y]^{CGC}=[\tau_i, CGR_i]_{i=1...M}$. Thereafter, the one or more predictors are split into a first dataset corresponding to $[X]^{CGC}=[X^{tr}]^{CGC}\cup[X^{val}]^{CGC}$, with $[X^{tr}]^{CGC}\cap[X^{val}]^{CGC}=\emptyset$, and the one or more targets are split into a second dataset corresponding to $[Y]^{CGC}=[Y^{tr}]^{CGC}\cup[Y^{val}]^{CGC}$, with $[Y^{tr}]^{CGC}\#[Y^{val}]^{CGC}=\emptyset$. The method then trains the first dataset via a supervised learning algorithm, and validates the second dataset via a supervised learning algorithm. For example, the supervised learning algorithm is a neural network library.

In accordance with another aspect of the present disclosure, a system for determining a growth rate of hydrogen induced damage in an asset is provided. For example, the asset is a steel pipeline, a pressure vessel, storage tank, or a piping system. The system includes a computer having a processor, a memory and a connection to a network. The computer has access to a database that stores historical data corresponding to a plurality of input parameters. For example, the historical data is stored in a baseline HIC map. Further, the system includes a data gathering device configured to gather asset design data and operating condition data at a region of the asset corresponding to the plurality of input parameters. The plurality of input parameters can include crack geometry data, crack location data, material properties data, hydrogen charging conditions data, or a combination thereof. For example, the data gathering device is a robot, an intrusive probe system, a non-intrusive probe system, or a patch probe. The computer of the system implements instructions to configure the processor to operate as an expert system. The configured processor or expert system is configured to receive from the database the historical data corresponding to the plurality of input parameters and receive from the data gathering device the asset design data and operating condition data at a region of the asset corresponding to the plurality of input parameters. The expert system is also configured to extract the plurality of input parameters from the historical data and the asset design data and operating condition data at a region of the asset, and process the extracted plurality of input parameters to output the growth rate of hydrogen induced damage at the region of the asset. In one or more implementations, the expert system is configured to process the extracted plurality of input parameters to output a new HIC map, which can then be provided as the historical data to the expert system.

In accordance with another aspect of the invention, the system is configured to derive a curve of a maximum allowable working pressure ("MAWP") versus time for the region of the asset, compare a value of the operating condition data over time to the curve to determine whether the difference in values of the operating condition data and the MAWP falls below a threshold, and generate and transmit an alert to an operator at the region of the asset. For example, the value of the operating condition data is a value of the operating pressure at the region of the asset. In one or more implementations, the system is also configured such that in response to receiving the alert, the operator automatically adjusts the operating conditions at the region of the asset to increase the difference in values of the operating condition data and the MAWP above the threshold. In one or more implementations, the system is configured to schedule, based on the output growth rate of hydrogen induced damage at the region of the asset, a fitness-for-service inspection at the region of the asset, including the insertion of a schedule entry among other entries in a service database to cause technicians or robots to have the growth region(s) so-identified inspected at a different time than previously scheduled or to have a scheduled time when there was no scheduled time for inspection already. In one or more implementations, the system is configured to generate and transmit an alert to the data gathering device based on the output growth rate of hydrogen induced damage at the region of the asset, and instruct the data gathering device to perform a fitness-for-service inspection at the region of the asset.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
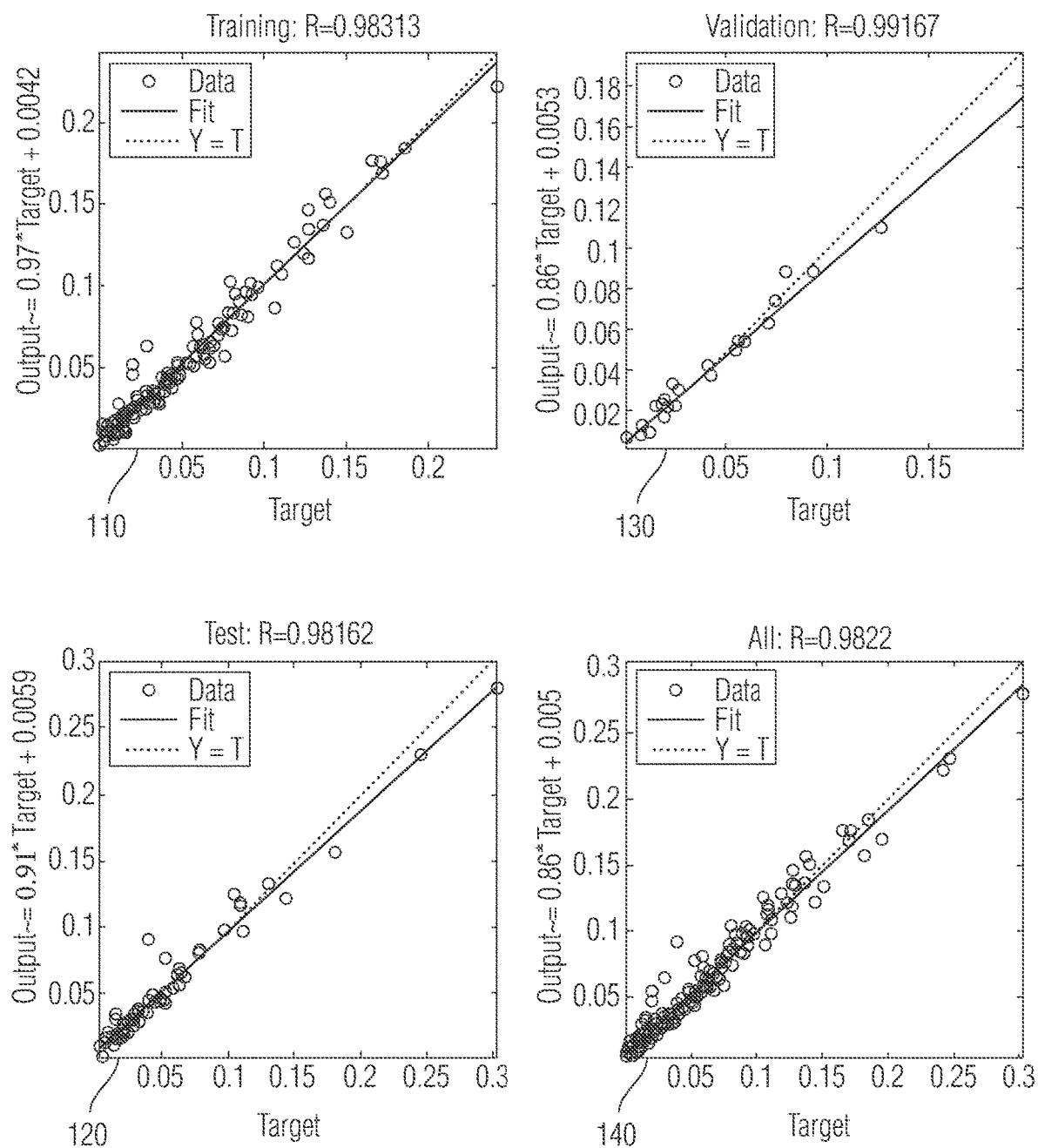
FIG. 1 presents graphical representations of correlations between targets and an expert system according to one or more implementations of the present invention.

Throughout the specification, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. Similarly, the phrase "one or more implementations" as used herein does not necessarily refer to the same implementation and the phrase "at least one implementation" as used herein does not necessarily refer to a different implementation. The intention is, for example, that claimed subject matter includes combinations of example implementations in whole or in part.

The present disclosure details systems and methods for improved HIC growth rate modeling. As present approaches in the technical field of HIC measurements and prediction have not been highly effective or efficient in determining crack growth characteristics, the present systems and methods employ hardware, software, and/or a combination of the two to provide a dynamic, self-improving and rapid expert system to predict crack growth characteristics (i.e., time to growth and crack growth rate (CGR)) of pre-existing linear hydrogen-induced cracks (linear HIC or blisters) detected during non-destructive inspections of steel pipelines, pressure vessels, storage tanks and piping systems. Particularly, the methodology includes building a surrogate model (the expert system) from a mechanistic HIC model arbitrarily chosen by the end-user. A mechanistic model is a first principle model that captures the interaction between the different physical and chemical phenomena that lead to HIC growth. The mechanistic model, which requires vast computing resources to capture the actual physics of the crack growth problem, is used to generate a simulated observation database used to train and validate the expert system. After successful training, the expert system is able to replicate the outputs of any arbitrary mechanistic model of linear HIC with very good precision, but with considerably lower computing resources requirements (CPU and memory usage), thus facilitating the transfer of the mechanistic model (e.g., finite element method-based) to practical field applications. In this way, the technical field of HIC damage measurement and analysis is improved by reducing the CPU time and memory usage in comparison to traditional mechanistic modeling, thereby providing systems capable of practical field uses (e.g., analyzing pipes having hundreds or thousands of cracks).

In one aspect of the invention, an expert prediction system is provided. Data representing strong non-linearity related to the onset of crack growth (which is specific to fracture mechanics) is filtered out when building the data needed to train the predictor of crack growth characteristics. To make the expert prediction system more robust, in one or more implementations, a global expert system is generated that includes two complementary expert sub-systems, where each expert sub-system is used for a given purpose and trained and validated on a specific dataset. More specifically, steps associated with predicting an onset of crack growth, which has a conditional output (i.e., CGR=0 vs CGR>0), is separated from predicting growth characteristics (i.e., time to initiation ($\tau$) and CGR). In one or more implementations, the latter is carried out only if crack growth is confirmed (i.e., CGR>0). In this way, determining the onset of crack growth is de-correlated from determining the stage of crack propagation, and each stage is handled by a different expert system.

In another aspect of the invention, a methodology is provided herein that is focused on building a dynamic self-improving solution. Upon availability of new non-destructive testing (NDT) data, a mechanistic model can be optimized (e.g., by adjusting the proper rolling direction fracture toughness) and each respective step of the methodology, such as design-of-experiments, database, training, testing and validation, incorporates the new NDT data to update the expert system. In one or more implementations, system optimization is automated, such that whenever new data is available, the expert system updates automatically and is made available to the end-user. NDT data may be gathered by ultrasonic techniques, as is known in the art.

In another aspect of the invention, the systems and methodology provided herein monitor physical assets (e.g., pipes, vessels, pipelines) in the field and predict the integrity of HIC-affected assets. For example, a baseline map from previously gathered NDT data and input equipment design data and current operating condition data (e.g., pressure, temperature, hydrogen charging) to derive the crack growth progress map over time at the HIC-affected area. In one or more implementations, the system includes hardware and other field devices which gather new NDT data for incorporation and analysis by the predictive system. In this way, the system can use the newly generated HIC maps to carry out FFS assessments in the field.

The methodology proposed in this invention has broad application and can be applied to other mechanistic models that simulate hydrogen-induced cracking growth and can be extended to other forms of environmental cracking such as stress corrosion cracking (SCC), sulfide stress cracking (SSC), or pitting corrosion.

In regard to conventional mechanistic modeling for HIC growth, the present invention improves the art by improving the computer functioning for HIC modeling, specifically by requiring much less CPU time and less memory. For example, the CPU time required to perform crack growth modeling using a trained expert system (which is on the order of seconds) is on average 1000 times less than the time taken by a common mechanistic model, such as a traditional finite element model (FEM), and further uses less memory than conventional models. Furthermore, for complex cases (i.e., hundreds or thousands of cracks), traditional FEM models could not converge to a solution in timeframes of less than hours to days, unless the computational mesh is refined. FEM models must also be continually refined, requiring more memory and CPU. For conventional FEM simulation of crack growth, a fine mesh size is required at the crack front and the region immediately near the crack (i.e., the fracture process zone). The more that the crack growth analysis is non-linear, the smaller the mesh size must be. If the mesh size is not properly selected, the solution will never converge, unless the mesh is refined. Such mesh issues are completely suppressed when using the expert system of the present invention, as no mesh is required. In this way, the system is able to run faster while performing computations.

Additionally, the present systems and methods herein improve CPU and memory functioning in regard to traditional modeling steps of: solving the discretized stress/displacement FEM problem: matrix formulation and resolution (expensive in both CPU and memory); computing the stress intensity factors (SIF) for each crack at each time step (expensive in CPU); and storing the nodal solution at each finite element node throughout the simulation (expensive in memory).

Furthermore, the present system accomplishes such improvements while still capturing, by the expert system, both the onset (or not) of crack growth and growth characteristics, without loss of accuracy as compared with a traditional mechanistic models (e.g., finite element method (FEM)). For example, FIG. 1 illustrates regression plots showing the high correlation between the targets and the expert system (CGR-ES) on the different datasets (training data 110, testing data 120, validation data 130 and all data 140).

In order to fully describe the systems and methods provided herein, a brief description of the conventional modeling techniques that the present invention improves upon is provided. Present historical-based predictive HIC growth rate methods are extremely difficult or even impossible to implement in practice due to the extremely high computing resources (processing and memory) required. In particular, for linear HIC or blistering damage (which is a precursor to the much more dangerous stepwise HIC) resulting from hydrogen uptake at the inner wall (for example, due to $H_2S$ corrosion at the surface), in order to attempt to predict the onset of crack growth and the crack growth rate of pre-existing linear HIC, certain numerical models are implemented that use numerical techniques requiring excessive computer resources, such as FEM, to discretize and solve the coupled equations of the mechanistic models.

Figure 2:
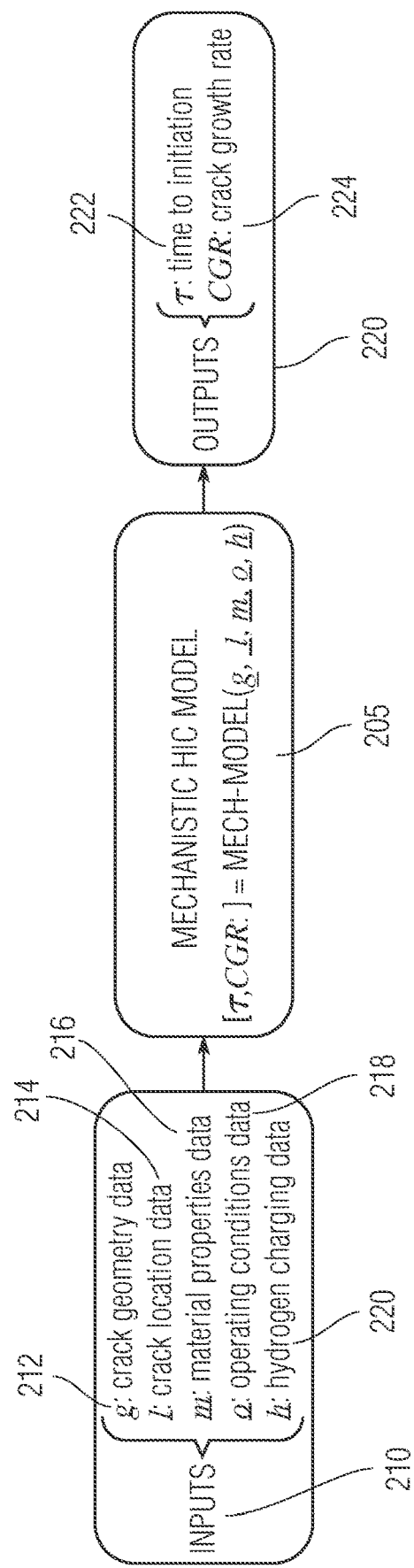
FIG. 2 presents a schematic diagram illustrating a system for generating a mechanistic HIC model according to one or more implementations of the present invention.

With reference to FIG. 2, a schematic illustration of the main inputs/outputs of a conventional mechanistic HIC model 205 is shown. Such a model 205 has a plurality of inputs 210, including: crack geometry data 212 (g—e.g., shape and size), crack location data 214 (l—e.g., depth measured from the outer wall, circumferential and axial distance from a reference point), material properties data 216 (m—e.g., metal strength, fracture toughness ($K_{IH}$) and hydrogen diffusion properties), operating conditions data 218 (o—e.g., temperature and pressure) and measured/calculated hydrogen charging conditions data 220 (h—e.g., measured/assumed hydrogen permeation rate, or equivalently the subsurface hydrogen charging concentration). The inputs 210 can be gathered in a real-time fashion or be retrieved from a database, such as a database containing previous non-destructive testing data. In case of a linear elastic material, the main output of these models is, generally, a crack growth curve 220, with the size of each individual defect as a function of time. This curve can be characterized by two main scalar attributes: the incubation period, also called time to growth 222 ($\tau$) (or time to initiation) and the crack growth rate 224 (CGR).

Figure 3:
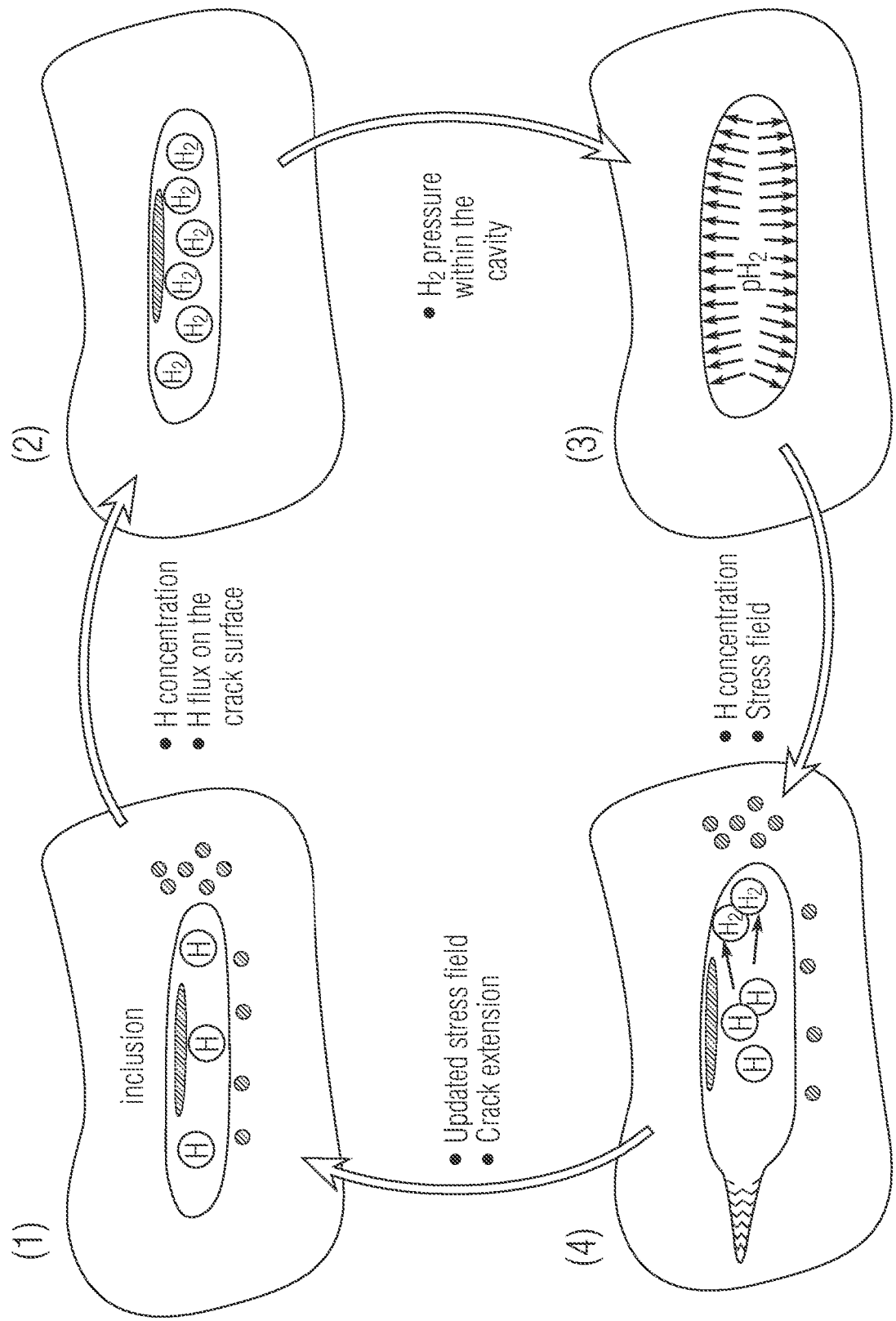
FIG. 3 presents a diagram illustrating the development of hydrogen induced cracking in steel pipelines.

As schematically summarized in FIG. 3, and depending on the complexity of the mechanistic model 205 used in the FEM simulation, a time-dependent hydrogen diffusion analysis is carried out for each defect to simulate the: (1) hydrogen uptake and diffusion from the inner wall towards the crack cavity, (2) trapping and pressure build-up at the crack surface, (3) embrittlement and hydrogen-induced decohesion along the failure process zone followed by (4) fracture growth and growth of the blister. This analysis is necessary to accurately capture the distribution of hydrogen concentration around the crack tip and at the crack flanks. The latter will locally control the hydrogen recombination reaction occurring at the HIC flanks and therefore the amount of hydrogen gas entrapped within the HIC cavity. The pressure kinetics within the HIC cavity is calculated from the current cavity volume and the total mass of hydrogen gas entrapped inside the cavity. The calculated pressure is then used as an input (load on the HIC flanks) to a finite element stress analysis. Depending on the stress intensity level achieved around the crack tip, the fracture toughness of the steel can be reached and the HIC crack further advances. Finally, crack extension can be suppressed when the increased volume of the cavity induces a meaningful drop in hydrogen pressure and then more hydrogen is needed to accumulate to reach the critical pressure for crack growth again. This whole loop is performed until the final condition is reached (e.g. achievement of a predefined exposition time).

Besides the potential requirements for licenses to commercial FEM packages and appropriate computing workstations, the time needed to run conventional simulations is a key limiting factor for such FEM solutions. Computing times are excessive (in terms of many hours to days) for practical situations where the growth of hundreds or thousands of defects are to be simulated. Further, as previously discussed, non-computing solutions are wholly unsuitable for practical use, as they essentially amount to engineer guesswork and fail to make an accurate and complete analysis of equipment having hundreds to thousands of cracks. A robust technical solution that preserves the accuracy of the mechanistic numerical model, but with short computing times (in terms of a few seconds to minutes) is required when it comes to practical field cases.

Figure 4:
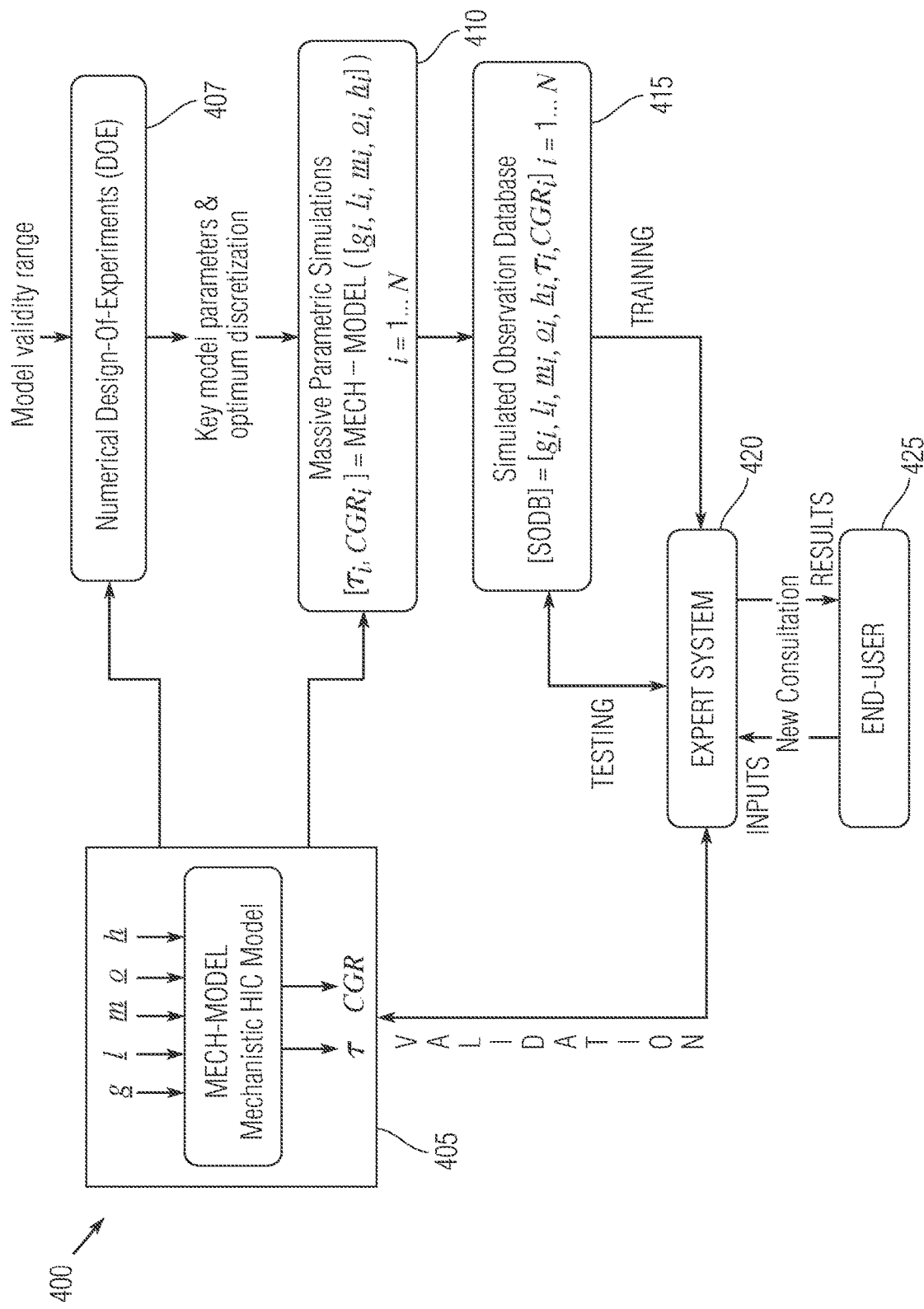
FIG. 4 presents a flow diagram illustrating a method for training an expert system for predicting HIC growth rate according to one or more implementations of the present invention.

With reference now to FIG. 4, a method for training an expert system for predicting HIC growth rate 400 according to one or more implementations of the present invention is illustrated. Such a method provides a solution that preserves the accuracy and validity of a validated mechanistic model for HIC growth (hereinafter referred to as "Mech-Model"), such as the model 205 in FIG. 2, while drastically reducing the requirements for computing resources. In one or more implementations, an expert system (e.g., an artificial neural network (ANN)) is trained and validated on a Simulated Observation Database (SODB). The simulated observations are stored within a database, (as noted by [SODB]), and consist of discrete inputs and corresponding outputs obtained using the Mech-Model (i.e., [SODB]=[$g_i$, $l_i$, $m_i$, $i_i$, $\tau_i$, $CGR_i]_{i=1 \ldots N}$, where N is the total number of observations/simulations). After successful training of the expert system on the simulated observation database, the expert system becomes the simulation engine used to make new predictions at any input point that is contained within the domain of validity of the Mech-Model. In other words the expert system becomes a surrogate of the Mech-Model.

The method 400 begins at step 405, in which a mechanistic model 205 receives one or more inputs relating to data about the structure in which HIC growth rate is to be measured. For example, the inputs can be one or more of crack geometry data 212 (g), crack location data 214 (l), material properties data 216 (m), operating conditions data 218 (o) and measured/calculated hydrogen charging conditions data 220 (h).

Next, the method 400 runs one or more parametric simulations implementing the Mech-Model to produce results that are used to build a simulated observation database [SODB], step 410. A parametric simulation is one in which all input parameters (e.g., g, l, m, o, h) are held constant except for a chosen parameter, which is then varied within a specified range to produce a range of results. The simulation then repeats the process by varying a different parameter within a specified range, while the other parameters are held constant.

Conventional parametric simulations having a single varied parameter are highly computer resource intensive (both in processor and memory resources), and further can fail to fully capture the effect of multi-parameter variations (i.e., interaction effects). For example, if the Mech-Model has eight scalar input parameters (temperature, pressure, crack size, crack location, wall thickness, charging hydrogen flux, yield stress, fracture toughness) and increments the parameter through the specified range in five equal increments in order to properly capture the response surface of the Mech-Model, then the total number of simulations required to build the database is $5^8$=390,625 simulations. If computing time averages 10 minutes per simulation (on one CPU), the total computing time required to generate this example database is 2,712 days (7.5 years). Even in a computing arrangement having massive parallelization on 100 CPUs, the simulations require a month to run and develop the database.

In contrast to the above traditional example, in one or more implementations, at step 407, the method 400 optionally performs one or more design-of-experiments (DOE) prior to running the parametric simulations in step 410 in order to identify critical model parameters. Performing step 407 may be done after the initial input step at 405, or after a completion of a loop of method 400 in order to improve results. The performing DOE step at 407 is particularly advantageous in situations in which there are particular input parameters that are not critical to predicting a crack growth rate, depending on the situation (e.g., data on a parameter is well-known). In performing DOE at step 407, the ranges of one or more parameters modeled on the input parameters are reduced or fixed to not vary at all. This reduces the number of simulations necessary to build the database, and significantly reduces the computing time and memory expended. For example, in a two-level numerical DOE, a full factorial design can be carried out by breaking the range for model parameters into just two larger increments (i.e., a total of $2^8$=256 simulations for a two-level DOE with the previous example parameters). The results of the numerical DOE are then graphed on main effects and interaction effects plots. In one or more embodiments, the method 400 analyzes these plots to determine which of the model parameters have less predictive value under the circumstances. For parameters having less predictive value, the parameter value can be varied in larger increments or even fixed to a particular value. Such model parameter discrimination reduces the total number of simulations needed to generate the database, while still preserving the most valuable information contained in the Mech-Model. In this way, the DOE analysis results identify the key governing parameters and the number of incremental levels to be considered for each parameter during the generation of the database.

At step 415, the method 400 builds a simulated observation database [SODB] from the results generated by the parametric simulations at step 410. According to conventional methodology, building a [SODB] is a computing resource intensive element, and the present method minimizes the computer resources used by generating the [SODB] only once to train and validate the expert system.

At step 420, an expert system is trained and tested by the [SODB]. The expert system is trained and tested using neural networks. The testing and training of the expert system is more fully described herein with reference to FIG. 7 and method 700.

Thereafter, the method 400 outputs a HIC growth rate prediction in an asset made by the expert system, and allows an end user to make future consultations without needing to build the [SODB] or expert system again, step 425. New consultations made by the end-user (within the range of model applicability) will directly use the expert system trained by method 400, which generates considerable savings in terms of computing times. For example, the expert system will run a large amount of simulations on the order of seconds to minutes, as compared with the hours or days required by a conventional Mech-Model alone (e.g., mechanistic model 205). In one or more implementations, other computing requirements (e.g., licenses for commercial FEM packages and high performance workstations) necessary to generate the database are limited to a single physical location within a company. Thus, the database can be generated in one location, but the trained expert system can be deployed to many locations without an increase to computing resource requirements or other costs.

Additionally, the present method 400 in one or more implementations allows for uncomplicated deployment by an end-user (e.g., a field engineer) in practical field applications. The manipulation of a trained expert system by the end-user is much simpler and safer than the manipulation of a traditional Mech-Model. For example, end-users carrying out fitness for service assessments (for example, level 1 and level 2 of API-579) are not necessarily qualified to use commercial FEM packages, and therefore conventional Mech-Model only approaches cannot be implemented by such users. In addition, even if the traditional Mech-Model is implemented by qualified personnel, the direct use of the Mech-Model increases the probability for simulation failures at a field site because use of the Mech-Model alone leads to problems with poor computational mesh quality, poor selection of solvers, and solution convergence issues. In contrast, the present invention avoids such issues when deploying an expert system in the field, since mesh quality, solvers and solution convergence issues are handled during the generation of the database.

In one or more implementations, the trained expert system in step 420 can be configured for deployment at a massive scale (i.e., many end-users and many simulations). This further improves the technical field of HIC growth rate modeling without introducing additional logistical complexities, as would occur with a large-scale deployment of a Mech-Model due to the Mech-Model's excessive computing resource requirements. For example, a full three-dimensional Mech-Model solution concerning a cracked portion of a structure having an area of a 500 mm by 500 mm by 30 mm in which multiple cracks are embedded results in tens of millions of nodes. To solve such a model, high performance workstations are required, such as those having 36 CPUs and 128 GB memory or more. Deployment of such Mech-Models at large scale would require that the above mentioned requirements are met for each end-user or at each site, as well as training and licenses for FEM packages for each end-user or at each site, which is very difficult to achieve, if not impossible.

Figure 5:
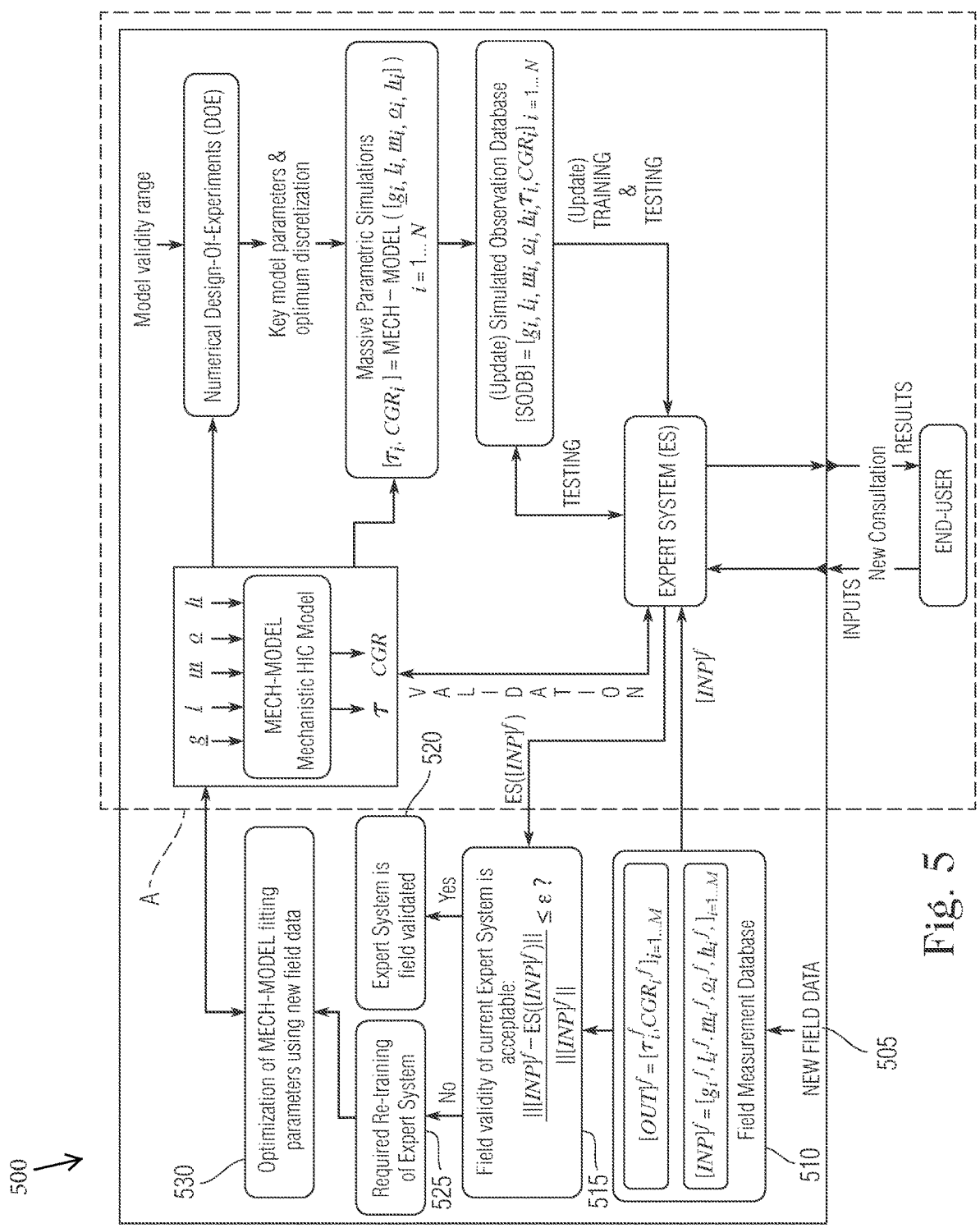
FIG. 5 presents a flow diagram illustrating a method for training an expert system for predicting HIC growth rate in which field and/or experimental data are periodically available according to one or more implementations of the present invention.

With reference now to FIG. 5, in one or more implementations, a method 500 for training an expert system for predicting HIC growth rate in which additional field and/or experimental data are periodically available is illustrated. For example, this method applies the method of FIG. 4, as shown by the steps enclosed by the dashed box A, and modifies it to account for newly available NDT inspection data generated at field locations. The method 500 begins by gathering new non-destructive testing (NDT) data, step 505. NDT inspection data can be gathered through a supervisory control and data acquisition ("SCADA") system, as is known in the art. A SCADA system is a system of software and hardware elements (e.g., programmable logic controllers ("PLC"), remote terminal units ("RTU"), factory machines, human-machine interface devices, sensors, end devices) that manage and control industrial processes locally or remotely. For example, a SCADA system can monitor, gather and process real-time data collected by inspection devices, such as by robots, probes, or sensors gathering operating conditions data at an asset such as a pipeline. Operating condition data is gathered at an inspection region, which in turn is fed to one or more PLCs or RTUs. PLCs and RTUs then feed gathered data to individual computer workstations or operator terminals over a network (e.g., wireless, WiFi, cellular networks, etc.). In one or more implementations, the method 500 instructs data gathering devices (e.g., information gathering robots, measuring devices located within a pipeline, etc.) to automatically obtain new data from time to time. For example, the method 500 can set data gathering devices to obtain new data daily, weekly or monthly, or the data gathering devices can have specific calendared dates at which to gather data. The method 500 may also implement criteria for determining optimal times to gather periodically-available field data for the training of the expert system, such as if the predictions lack accuracy using current data.

Next, the newly gathered data is used to build a field measurement database, step 510. The field measurement database can built as the [SODB] is built in step 415. In one or more implementations, the method 500 branches to step 420 and embeds new field data directly into a previously generated simulated observation database and applies the data as an additional training or testing set during an updated training of the expert system. However, in doing so, the new field data must be reviewed for consistency with the current results generated by the present [SODB]. Application of new data to a database that contains non-consistent results may lead to bad quality predictions (which are, for example, a known drawback of traditional neural networks).

The method 500 continues, step 515, and splits new data into field inputs ($[INP]^f$) and field outputs ($[OUT]^f$), tests the consistency (i.e., field validity) of the current Expert System (ES) by comparing the field outputs $[OUT]^f$ with the prediction of ES on the field inputs $ES([INP]^f)$ to determine if the current ES needs to be re-trained. This is done according to the equation $$\frac{\|[INP]^f - ES([INP]^f)\|}{\|[INP]^f\|} \le \varepsilon,$$

where £ is a tolerance factor used to control the level of consistency required. If the consistency of the field data is within the tolerance factor, the expert system is validated, step 520. The newly acquired field data is then used to optimize the internal Mech-Model parameter (in such a case an auxiliary optimization problem must be solved, as discussed below) prior to carrying out a new training/testing/validation loop. If the consistency of the field data is not within the tolerance factor, the expert system must be retrained, step 525. Re-training the expert system is done as initial training is done as described in reference to FIG. 7. Depending on the results of the consistency testing, computing time can be saved if the ES already fits the newly acquired data well, as the method avoids re-training the ES. The method described in FIG. 5 can be automated such that the process is carried out in view of assessing the consistency of the current ES, or alternatively improving the ES through a new training in light of newly available field data. In this way, the expert system of the present invention is dynamic and self-improving.

The periodic optimization of the Mech-Model parameters as presented in the method 500 of FIG. 5 can also face an auxiliary optimization problem, step 530. As provided in an example implementation, the Mech-Model input parameters are represented by vectors g, l, m, o, h which represent respectively the crack geometry (size) data, location data, steel mechanical properties, operating conditions, and hydrogen charging conditions. In field application, two parameters are frequently critical, namely the steel mechanical properties (particularly the material fracture toughness in a hydrogen environment) and the hydrogen charging conditions. The former parameter controls the resistance of the material to fracture while the latter controls the driving force for fracture to take place. Other model parameters (crack geometry, location and operating conditions) are frequently relatively easy to determine with acceptable level of confidence.

The hydrogen charging conditions (i.e., the hydrogen charging flux) are mainly controlled by the pH and the partial pressure of $H_2S$ in the environment in contact with the inner walls of the equipment. It can also be affected by the rate of formation and/or rupture of the passivating iron sulfide scale FeS forming at the inner wall as a result of the corrosion reaction. Modelling the actual sour corrosion reaction and hydrogen adsorption/absorption at the steel is far too complicated and would bring additional parameters to the model that need to be properly calibrated. Commercial portable probes (for example, the Hydrosteel 6000©) are available in the market and can be used to measure directly (when possible) the hydrogen permeation flux at any location on the damaged equipment. The measurements are carried out from the outer surface of the equipment and can then be used as input to the Mech-Model.

In regard to the steel mechanical properties in hydrogen environment, the main data required by the end-user is generally available in published literature or handbooks for common steel grades, except the fracture toughness in hydrogen environment $K_{IH}$ in which data availability is limited to the fracture toughness in the short transverse direction, noted $K_{IH}^{ST}$, that is for a crack propagation in the Short transverse-Transverse (S-T) plane. However, the fracture toughness of interest when simulating the propagation of linear HIC (blisters) is the one measured in the rolling direction, meaning a crack propagating in the Longitudinal-Transverse (L-T) plane. This fracture toughness, noted $K_{IH}^{LT}$, is much lower than $K_{IH}^{ST}$ due to the manufacturing process (rolling) weak banded microstructure along the rolling direction. $K_{IH}^{LT}$ data is not available in the literature which, due to the relatively thin wall, is linked to the difficulty to extract a standard fracture testing specimen consistent with ASTM E1820 specifications. Therefore, $K_{IH}^{ST}$ can be regarded as an upper bound of $K_{IH}^{LT}$, which can be further tuned to fit the experimental/field data.

Thus, in one or more implementations, the method 500 provides $K_{IH}^{LT}$ as an optimization parameter of the model to better fit the numerical prediction of the Mech-Model with the field data measurements at step 530.

Figure 6:
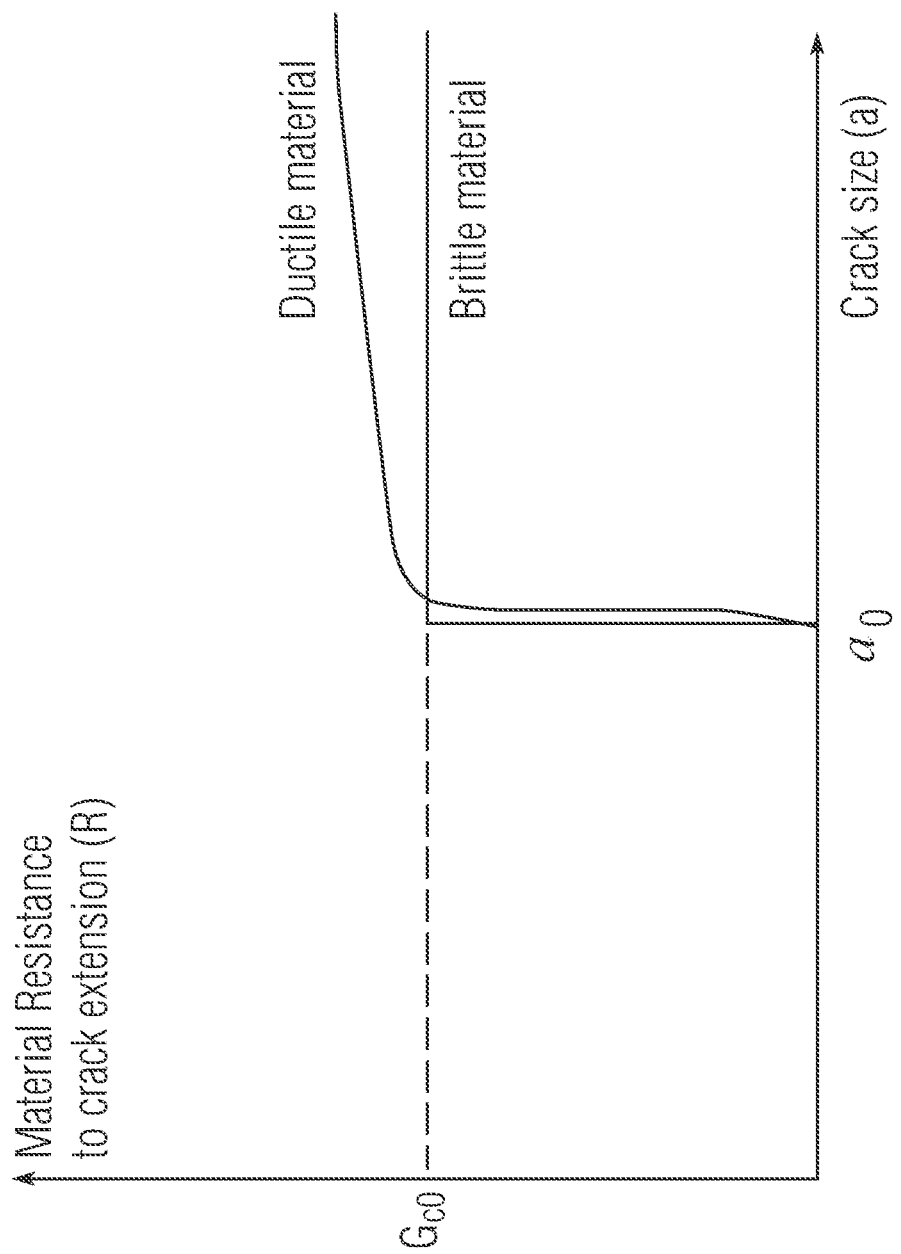
FIG. 6 presents a schematic diagram of a material R-curve for brittle material and ductile material according to one or more implementations of the present invention.

In one or more implementations, the specificity of the training phase of the expert system implements particular precautions to ensure good stability and accurate predictions of the developed expert system. Referring to FIG. 6, in one or more implementations, a direct training approach is used. For example, the numerical database $[SODB]=[g_i, l_i, m_i, o_i, h_i, \tau_i, CGR_i]_{i=1 \ldots N}$ can be separated into predictors, noted $[X]=[g_i, l_i, m_i, o_i, h_i]_{i=1 \ldots N}$, and corresponding targets, noted $[Y]=[\tau_i, CGR_i]_{i=1 \ldots N}$. Next, the predictors and corresponding targets are split into two distinct datasets: a first dataset $\{[X^{tr}]=[g_i, l_i, m_i, o_i, h_i]_{i=1 \ldots k}, [Y^{tr}]=[\tau_i, CGR_i]_{i=1 \ldots k}\}$ (in general $$\frac{N}{2} \leq k \leq \frac{2N}{3},$$

i.e., approximately 50-70% of the total number of observations contained in the database) used to train the expert system (using any of the supervised learning algorithms widely available in the literature); and a second dataset $\{[X^{val}]=[g_i, l_i, m_i, o_i, h_i]_{i=k \ldots N}, [Y^{val}]=[\tau_i, CGR_i]_{i=k \ldots N}\}$ (containing the remaining 30-50% of the observations) used to validate and assess the quality of the training.

However, due to particular interacting phenomena that can occur at pipes or vessels during hydrogen degradation, direct training approaches can have limited success. This is because during the training phase of an expert system, (e.g., a neural network), the weights associated with the input data are adjusted at each iteration until the error between the expert system predictions and the training targets $[Y^{tr}]$ is minimized. In other words, the expert system used in this case will try to adjust during the training phase in order to properly capture all the non-linearities that may exist between $[X^{tr}]$ and $[Y^{tr}]$. In particular, the following are examples of non-linear phenomena which can cause a training phase to fail or converge with poor correlation coefficient (R-value): diffusion of hydrogen in the presence of stress field, metallurgical traps and geometrical discontinuities (i.e., pre-existing HIC cavities) which tend also to act as traps for hydrogen; pressure build up within the pre-existing HIC cracks associated with the thermodynamic equilibrium between hydrogen gas in the cavity and atomic hydrogen in the steel lattice; reduction in the steel cohesive energy (and therefore fracture toughness) in the fracture process zone (FPZ) ahead of the tip, which is associated with the accumulation of hydrogen in the high triaxiality region in the FPZ; sudden release of potential energy (which can no longer be accommodated by the material in the form of elastic deformation), resulting in crack growth and creation of new crack surfaces; and crack propagation controlled by the kinetics of pressure build-up inside the cavity and the non-uniform material fracture toughness distribution.

The most severe non-linear phenomenon to handle numerically is associated with the sudden growth of the crack. The Griffith energy balance in fracture mechanics states that crack growth takes place if (and only if) the potential energy release rate $\partial\Pi/\partial t$ (defined as the rate in change of potential energy $\Pi$ associated with an elementary change in the crack surface area) exceeds the surface energy of the material $G_c$ (another measure of material fracture toughness). As illustrated graphically in FIG. 6, regarding a comparison between a ductile material and a brittle material, crack growth according to the Griffith energy balance can be better visualized in the plot of the material R-curve (i.e., material resistance to fracture versus crack size). Sudden crack growth is mathematically represented by a step/jump function, which is a discontinuous function known to introduce a strong non-linearity in the model. Other non-linear phenomena are mathematically described by continuous Partial Differential Equations and continuous non-linear functions.

In order to overcome the technical problem of modeling non-linear phenomena associated with hydrogen-induced physical derogation of metal pipes, in one or more implementations, the methods disclosed herein split the global expert system into two complementary expert sub-systems, in which each expert system is used for a given purpose and trained and validated on a specific dataset. More specifically, the prediction of onset of crack growth, which is categorical output variable (i.e., CGR=0 vs. CGR>0), is separated from the prediction of crack growth characteristics (i.e., $\tau$ and CGR), which the latter is carried out only if crack growth is confirmed (i.e., CGR>0).

This approach stands in contrast to the conventional direct approach as if, during the massive parametric simulations, crack growth did not take place (i.e., because of insufficient crack driving force), the output of the Mech-Model simulation would be $\tau=\infty$ and CGR=0. Therefore, if a supervised learning is carried out by the direct approach, i.e., $[X]=[g_i, l_i, m_i, o_i, h_i]_{i=1 \ldots N}$ and $[Y]=[\tau_i, CGR_i]_{i=1 \ldots N}$, the target matrix $[Y]$ would contain a considerable number of $[\infty, 0]$ elements. These observations encompass the strong-nonlinearity of the fracture growth problem and cause significant issues during the training phase of the expert system and would result in an unstable predictor. In one or more implementations, the present method does not include such observations into the training data used to predict the crack growth characteristics (i.e., $\tau$ and CGR).

Figure 7:
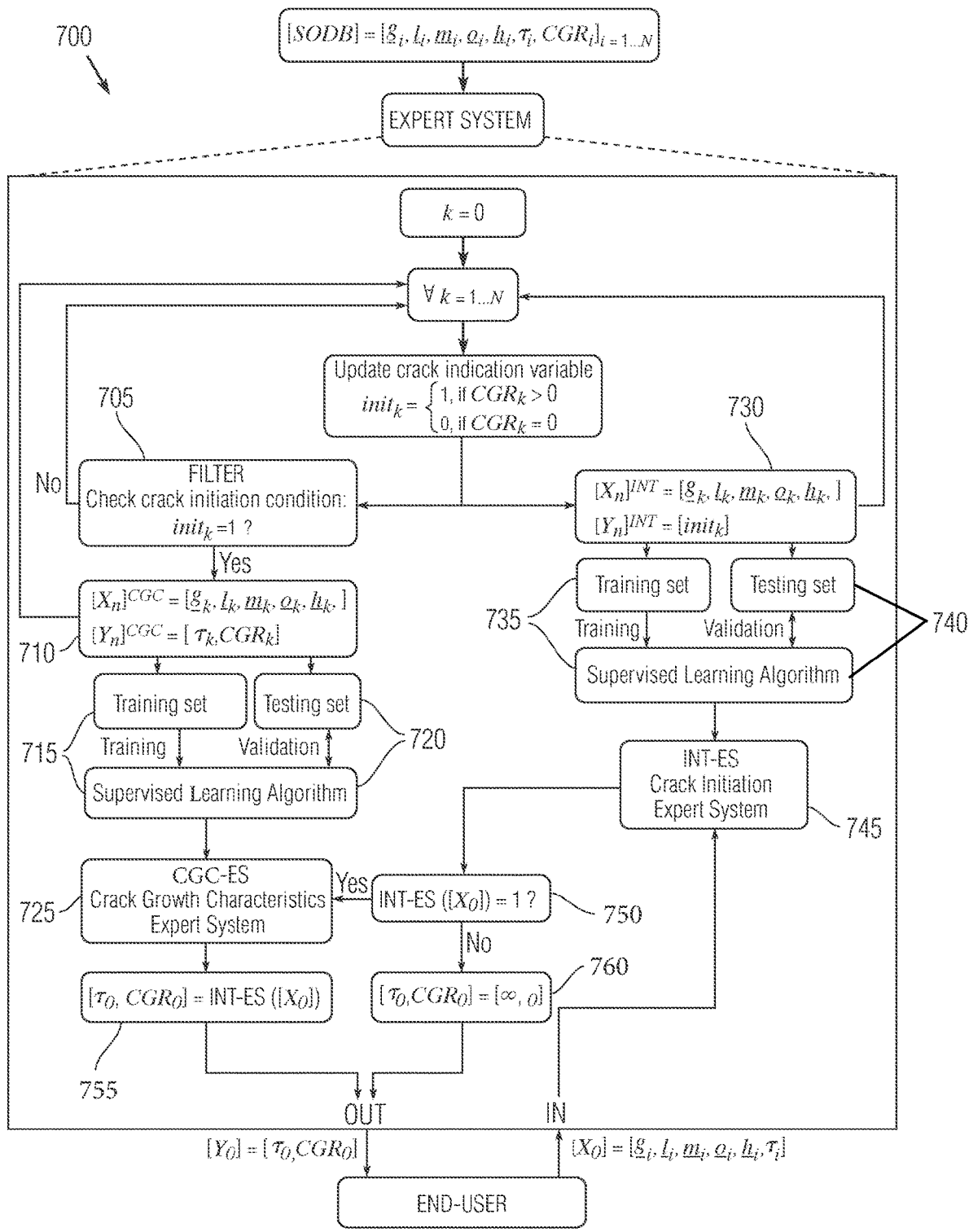
FIG. 7 presents a flow diagram illustrating a detailed method for training an expert system for predicting HIC growth rate according to one or more implementations of the present invention.

With reference now to FIG. 7, a flow diagram illustrating a method 700 for training an expert system for predicting HIC growth rate according to one or more implementations. Method 700 may be implemented in accordance with other methods herein; for example, method 700 may be practiced in the training and testing step 420 of method 400. Method 700 processes the data stored in [SODB] to create a pair of expert systems, a Crack Growth Characteristic Expert System ("CGC-ES") for predicting crack growth characteristics and a Crack Initiation Expert System ("INT-ES") for predicting (i.e., confirming or denying) the onset of crack growth. The CGC-ES is a filtered version of the [SODB] in which input variables that produce results in which no crack growth rate characteristics ("CGC") are simulated are removed from the dataset. That is, at step 705, a filter is used to sweep the raw database [SODB] in order to discriminate all the observations verifying the condition: CGR>0. All of these observations, which correspond exclusively to simulations where fracture growth took place, are then copied into a new database, named $[NDB]^{CGC}$, which has the same format as the raw database (i.e., $[SODB]^{CGC} = [g_i, l_i, m_i, o_i, h_i, \tau_i, CGR_i]_{i=1 \ldots M}$, with M<N, and $\forall i \in [1, M]$, $CGR_i$>0). Since the filtered database does not contain the strong non-linearity associated with the onset of crack growth, a direct supervised learning can be carried out using $[NDB]^{CGC}$ without affecting the stability of the produced expert system (CGC-ES).

In one or more implementations, the method 700 for training the expert system to predict the CGC, includes at step 710 splitting the database $[SOD]^{CGC}$ into predictors $[X]^{CGC} = [g_i, l_i, m_i, o_i, h_i]_{i=1 \ldots M}$ and targets $[Y]^{CGC} = [\tau_i, CGR_i]_{i=1 \ldots M}$ and splitting the predictors and the corresponding targets into two distinct datasets as follows:

a. $[X]^{CGC} = [X^{tr}]^{CGC} \cup [X^{val}]^{CGC}$, with $[X^{tr}]^{CGC} \cap [X^{val}]^{CGC} = \emptyset$.

b. $[Y]^{CGC} = [Y^{tr}]^{CGC} \cup [Y^{val}]^{CGC}$, with $[Y^{tr}]^{CGC} \cap [Y^{val}]^{CGC} = \emptyset$.

Thereafter, at step 715 the CGC-ES is trained via a supervised learning algorithm on a training set, and the CGC-ES predictions are validated on the testing set by plotting the residuals CGC-ES$([X^{val}]^{CGC}) - [Y^{val}]^{CGC}$, step 720.

The produced expert system CGC-ES (as shown by block 725) is insufficient to characterize the entire process, since as disclosed elsewhere herein, it does not account for the strong non-linearity associated with the Griffith energy balance for onset of crack growth. Thus, in one or more implementations, the method 700 then generates the INT-ES. To train the INT-ES, a new database $[SODB]^{INT}$ is derived from the raw dataset of observations:

$$[SODB]^{INT} = [g_i, l_i, m_i, o_i, h_i, init_i]_{i=1 \ldots N}, \text{ with}$$

$$init_i = \begin{cases} 1, & \text{if } CGR_i > 0 \\ 0, & \text{if } CGR_i = 0 \end{cases}.$$

In one or more implementations, the method for training the expert system to predict the onset of crack growth includes: splitting $[NDB]^{INT}$ into predictors $[X]^{INT} = [g_i, l_i, m_i, o_i, h_i]_{i=1 \ldots N}$ and targets $[Y]^{INT} = [init_i]_{i=1 \ldots N}$ and splitting the predictors and the corresponding targets into two distinct datasets for training and validation respectively, step 730. Thereafter, at step 735 the INT-ES is trained on the training set using a supervised learning algorithm (note that the targets contained in $[Y^{tr}]$ are Boolean, and therefore an appropriate supervised algorithm must be selected); and the INT-ES predictions are validated on the testing set by plotting the residuals INT-ES$([X^{val}]^{INT}) - [Y^{val}]^{INT}$, step 740. This produces the INT-ES system as illustrated by block 745.

The method 700 of FIG. 7 additionally illustrates the way the expert systems are used to make new predictions after receiving a new input $(g_0, l_0, m_0, o_0, h_0)$. In one or more implementations, the method 700 of the workflow of predictions includes: passing $[X_0] = (g_0, l_0, m_0, o_0, h_0)$ as an input argument to INT-ES, step 750. If onset of crack growth is confirmed (i.e., INT-ES$([X_0])=1$), then the method 700 branches back to the CGC-ES generated at block 725 by passing $[X_0]$ as an input argument to CGC-ES. Thereafter, the CGC-ES generates the result of $[\tau 0, CGR_0]=$INT-ES$([X_0])$, which is then output to the end user, step 755. If onset of crack growth is not confirmed (i.e., INT-ES$([X_0]) \neq 1$), the method 700 branches to step 760, and terminates the simulation with the following result: $\tau = \infty$ and CGR=0. In that instance, crack growth characteristics are predicted using: $[\tau, CGR]=$CGR-ES$([X_0])$.

Figure 8:
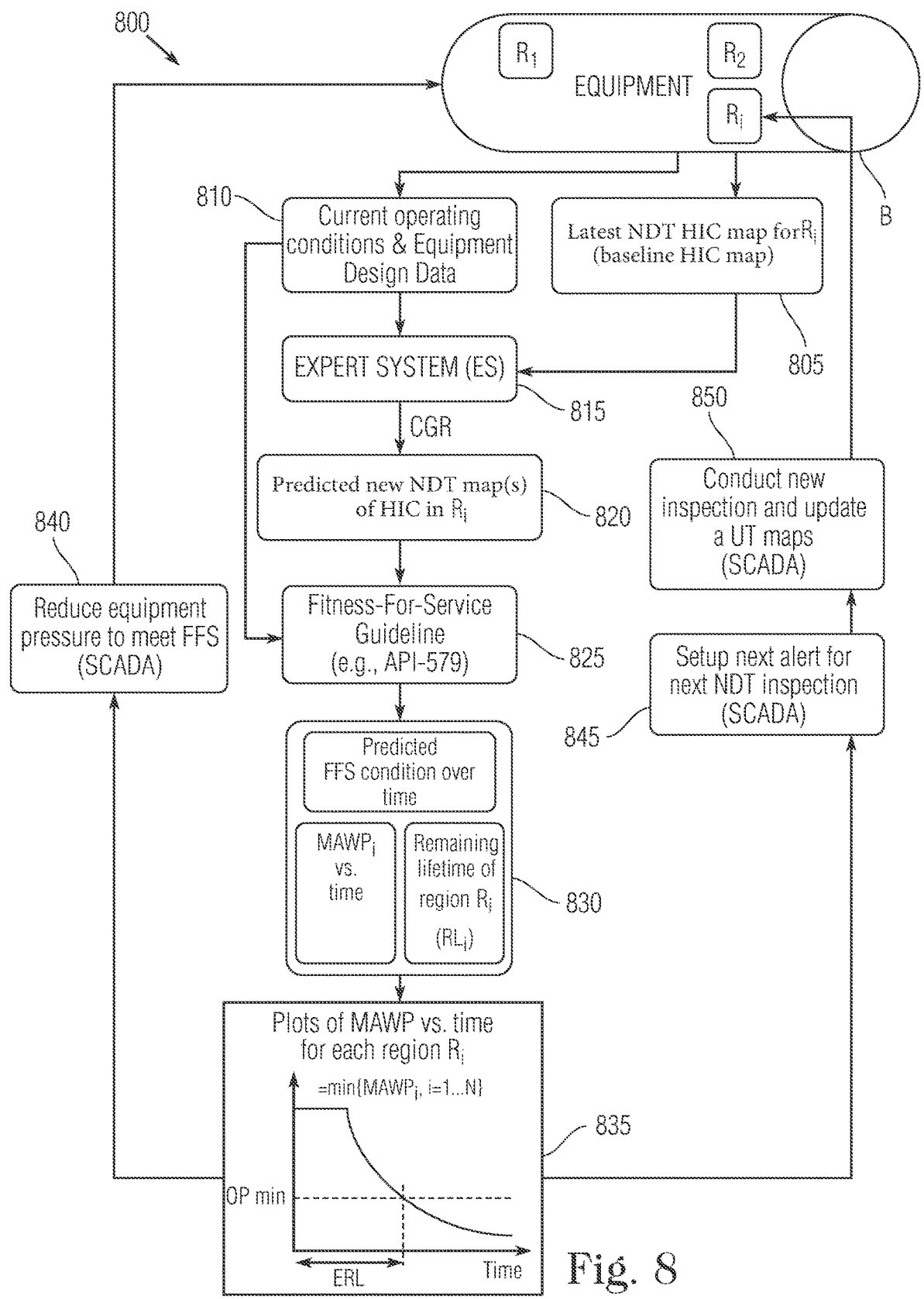
FIG. 8 presents a flow diagram illustrating a method for predicting HIC growth rate with field operation data incorporation according to one or more implementations of the present invention.

With reference now to FIG. 8, in one or more implementations, the present systems and methods include practical field uses in which HIC growth rate can be predicted by gathering and incorporating field operation data. For example, NDT data gathered from monitoring a physical equipment/asset (e.g., a pipe), can be used to predict the integrity and lifetime of that physical asset.

FIG. 8 illustrates a method flow 800 in which new environment data that is generated at a physical asset (as denoted by reference "B") is periodically passed into a trained expert system (as in method 700) to refine predictions and fitness-for-service of the physical asset B over time. For a given piece of equipment B, there can be one or more HIC-affected regions identified (e.g., $R_1, R_2, \ldots R_i$, where i is the number of HIC-affected regions to analyze). The method 800 begins at step 805 by creating a baseline HIC growth map for a HIC-affected region $R_1$ using historical NDT data according to one or more implementations provided elsewhere herein. A HIC map can be created, for example, using ultrasonic mapping, as is known in the art. At each HIC region $R_1$, equipment design data and current operating conditions are measured (e.g., pressure, temperature and hydrogen charging) using conventional sensors and instruments, step 810. Thereafter, at step 815, the baseline HIC map, equipment design data and current operating conditions measured at the field site are input to an expert system as in one or more implementations described elsewhere herein, step 815. The expert system processes this raw data to extract the inputs (e.g., [g, l, m, o, h], as in FIG. 2) required to run the HIC growth analysis for each region $R_i$ to compute the corresponding crack growth rate (CGR).

For each region $R_i$, the computed CGR values are used to predict new HIC maps for each region by artificially growing each existing HIC defect from the baseline HIC map at the corresponding computed CGR to form one or more new non-destructive testing map(s) of HIC in each region analyzed, step 820. The method 800 continues at step 825, in which the newly predicted HIC maps are used as input to carry out multiple fitness for service (FFS) assessments (e.g., as per API-579). In one or more implementations, the method then derives curves of maximum allowable working pressure ("MAWP") versus time for each region $R_i$ at step 830. For example, if the minimum operating pressure of the equipment of interest is input to the system, then the remaining lifetime of each region $R_i$ (denoted by $RL_i$ in block 830 of FIG. 8) of the equipment can quickly and directly be calculated by plotting MAWP vs. time for that region. The equipment remaining lifetime ("ERL"), which corresponds to the minimum of all computed $RL_i$ (the weakest region in the equipment will determine the value of ERL), can then be used to set up the frequency of future NDT inspections and automatically setup an alarm for inspectors (e.g., using SCADA). An example of a MAWP vs. time plot with ERL indicated is shown in block 835.

In addition, the computed MAWP of the equipment as a function of time can be used to ensure that the equipment is continually fit-for-service. In other words, at all times (t) the value of the operating pressure (OP) is compared to the computed value of MAWP(t). In one or more implementations, the method 800 generates an alert (e.g., using SCADA) when the values of OP and MAWP become too close. This alert is sent to an operator whereby the operating pressure is automatically adjusted to a sufficient margin below the MAWP, step 840.

It will also be appreciated that this type of alert system can be part of an automated process in which the system generated alert is sent over a network (e.g., wirelessly) or the like to an automated piece of equipment, such as a robotic inspection device. The robotic inspection device receives the alert information which includes computed location information and the robotic inspection device can then travel to the target location for inspection thereof. Real-time inspection information can be delivered to a command center (e.g., central station) and/or inspection information can be gathered and stored in memory for later download. It will also be understood that the present system can generate scheduling information based on system output and such scheduling information represents a time at which a particular surface should or needs to be inspected. The scheduling information can be stored in memory and then either a person and/or a piece of automated equipment is alerted when it is time to inspect such surface. In one or more implementations, in response to an alert, the method 800 optionally schedules a non-destructive testing inspection, step 845. At a time thereafter, an in-situ inspection can be conducted and the newly gathered data can be used to update the baseline HIC map, step 850. The method 800 can then repeat.

Figure 9:
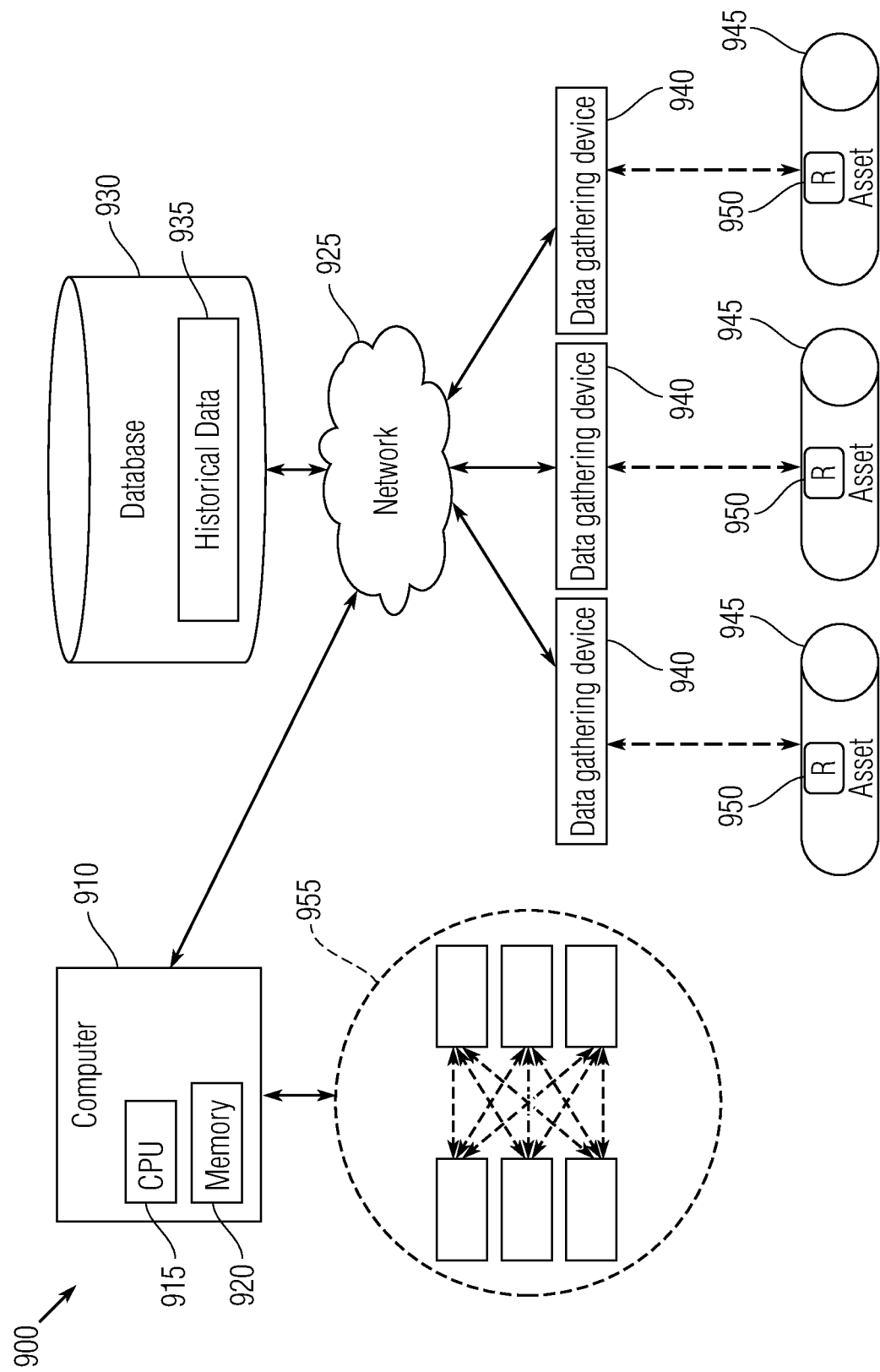
FIG. 9 presents a schematic diagram of an exemplary system for predicting a growth rate of hydrogen induced damage in one or more assets according to one or more implementations of the present invention.

With reference now to FIG. 9, a system 900 for predicting a growth rate of hydrogen induced damage in one or more assets is provided. The system 900 is provided as an example of a practical application of the methods for predicting HIC growth rate as described elsewhere herein. The system 900 includes a computing device 910, the computing device having a processor 915, a memory 920, and is in connection with a network 925. The network 925 can be, for example, a wired or wireless network, a cellular network, a Wide Area Network ("WAN"), or a Local Area Network ("LAN"). In one or more implementations, the computing device 910 has access to a database 930 via network 925. In one or more implementations, the computing device 910 includes a local database. The database 930 includes historical NDT data 935, which includes information regarding operating conditions and structural data of an asset as captured in the past. For example, as shown in FIG. 9, one or more data gathering devices 940 are implemented to gather operating conditions and structural data of an asset 945, and in particular, at a region 950 of the asset. In one or more implementations, the historical data 935 is stored in a baseline HIC map. Data gathering devices 940 can include robotic inspection devices having ultrasonic sensors or scanners, in-situ probes, or the like. The processor 915 receives the historical data 935 pertaining to the particular region 950 as input parameters (e.g., g, l, m, o, h), which is then processed using a neural network 955 according to the methods herein (e.g., method 400, method 500, method 700) to output a prediction of the growth rate of HIC.

System 900 can also operate to periodically update its output growth rate predictions by incorporating new NDT captured by the data gathering devices 940. The processor 915 of the computing device 910 is in communication with the data gathering devices 940 via the network 925 and can implement instructions stored in the memory 920 (e.g., program code) to configure the data gathering devices to gather current asset design data and operating condition data at a region 950 of an asset 945 corresponding to the plurality of input parameters. The current asset design data and the operating condition data is then transmitted by the data gathering devices 940 to the computing device 910 via the network 925. The computing device 910 then implements instructions to configure the processor 915 to operate as an expert system. The configured processor 915 then receives from the database 930 the historical data 935 corresponding to the plurality of input parameters corresponding to the region 950 of the asset 945, and receives the transmitted current asset design data and the operating condition data from the data gathering devices 940 for the region corresponding to same plurality of input parameters as with the historical data. The configured processor 915 then extracts the plurality of input parameters from the historical data and the current asset design data and the operating condition data and then processes the extracted plurality of input parameters to output the growth rate of hydrogen induced damage in the region 950 at the asset 945, as described herein (e.g., method 400, method 500, method 700). In one or more implementations, the configured processor 915 processes the extracted plurality of input parameters to output a new HIC map, which can thereafter be stored in memory 920 or database 930. The new HIC map can then be provided as historical data 935 for future growth rate predictions.

Based on the predicted growth rate output by the configured processor 915 after taking into account the current operating conditions and structural data at region 950, in one or more implementations, the system 900 can schedule, a fitness-for-service inspection at the region of the asset. For example, if there is a prediction of high crack growth rate, an inspection can be scheduled immediately by operation of the code implemented in the processor of the system 900. As another example, such a prediction of high crack growth rate can cause an existing inspection to be rescheduled from a remote time in the future to instead be queued for comparatively more immediate inspection. In so doing, the system 900 can create or modify schedule entries among other entries in a service database to cause technicians or robots to have the predicted high crack growth region(s) inspected at a different time than had been previously scheduled, or to have a scheduled time when there was no scheduled time for inspection. In one or more implementations, the system 900 can generate and transmit an alert to a data gathering device 940 based on the output growth rate of hydrogen induced damage at the region 950 of the asset 945, and instruct the data gathering device to perform a fitness-for-service inspection at the region of the asset.

In order to further develop the technical nature of and verify the present invention, a pilot study experiment was performed as to one implementation of the invention and is hereafter detailed. This pilot study represents an example of an implementation of the present invention, and is not intended to limit the present invention to only this example implementation.

Pilot Study

The mathematical foundation of the mechanistic HIC growth model relies the following fundamental assumptions. The bulk material is assumed to be isotropic and linear elastic, which is supported by the fact that HIC develop in the segregation bands (i.e., brittle regions) in which the fracture toughness is well below that recorded for the base material, and as a result, diffuse yielding is prevented and plasticity is limited to a very small near tip process zone. A single mode I crack propagating in the direction parallel to the pipe wall is assumed, which is supported by experimental findings from the field, namely that the ultrasonic thickness mapping data revealed that HIC damage is usually triggered at the mid-wall thickness of the pipe. A single HIC is modeled as a penny-shaped crack under two-dimensional axisymmetric conditions, which is appropriate as long as the radius of the crack is small compared to the inner radius of the pipe (typically above 16 inches).

From a theoretical point of view, the originality of this mechanistic model is that it considers the couplings between different physics in a time-dependent (i.e., dynamic) framework, with direct link to the actual in-field conditions (pH and $pH_2S$). More specifically, with reference to FIG. 3 discussed previously, a diffusion analysis (1) is carried out to model hydrogen uptake and transport from the inner wall (in contact with the sour environment) to the interior of the pipe. This analysis allows access to the distribution of hydrogen around the crack tip and the hydrogen flux at crack flanks. This also controls the hydrogen recombination reaction at the crack surface and therefore affects the pressure build-up (2) mechanism. The pressure within the crack can be determined on the basis of the current crack volume and the total mass of molecular hydrogen inside the cavity. The pressure is then employed as an input parameter in order to perform the stress analysis (3). Depending on the stress level achieved around the crack tip, the hydrogen-affected fracture toughness of the steel can be reached and the HIC process further advances. Finally, crack extension (4) can be suppressed when the increased volume of the cavity induces a meaningful drop in hydrogen pressure. The whole loop is performed until the final condition is reached (e.g., achievement of a predefined exposition time). The commercial FEM package COMSOL Multiphysics was used to implement and solve the model equations.

Numerical Design of Experiment (DOE)

In this study, a mechanistic model as previously presented makes use of 5 input parameters, which are: the hydrogen charging concentration at the inner wall $C_0$ (which is dictated the value of pH of the sour environment and the partial pressure of $H_2S$), the pipe wall thickness ($d_p$), the HIC initial radius ($a_0$), the HIC depth in percentage of the wall thickness (h %, measured from the inner wall) and the material fracture toughness in hydrogen environment ($K_{IC}$). Table 1 below shows the range of the 5 model parameters. This range is selected to cover a wide range of possible scenarios (the bounds for $C_0$ are computed from the bounds of pH and $pH_2S$).

TABLE 1

Variation ranges for the critical model parameters

| Model Parameter | Min | Max |
| --- | --- | --- |
| $C_0$ (wtppm) | 0.2 (eq. to pH = 6, pH2S = 10) | 1.4 (eq. to pH = 3, pH2S = 1000) |
| $a_0$ (mm) | 0.05 | 5 |
| $d_p$ (mm) | 10 | 20 |
| h (%) | 25 | 75 |
| $K_{IC}$ (MPa√mm) | 250 | 700 |

For the numerical DOE analysis, a full factorial design with two levels per model parameter (up level=max value, low level=min value) was considered, which led to a total of $2^5$ (i.e., 32) simulations run on a standard workstation during 10 hours CPU time.

Figure 10:
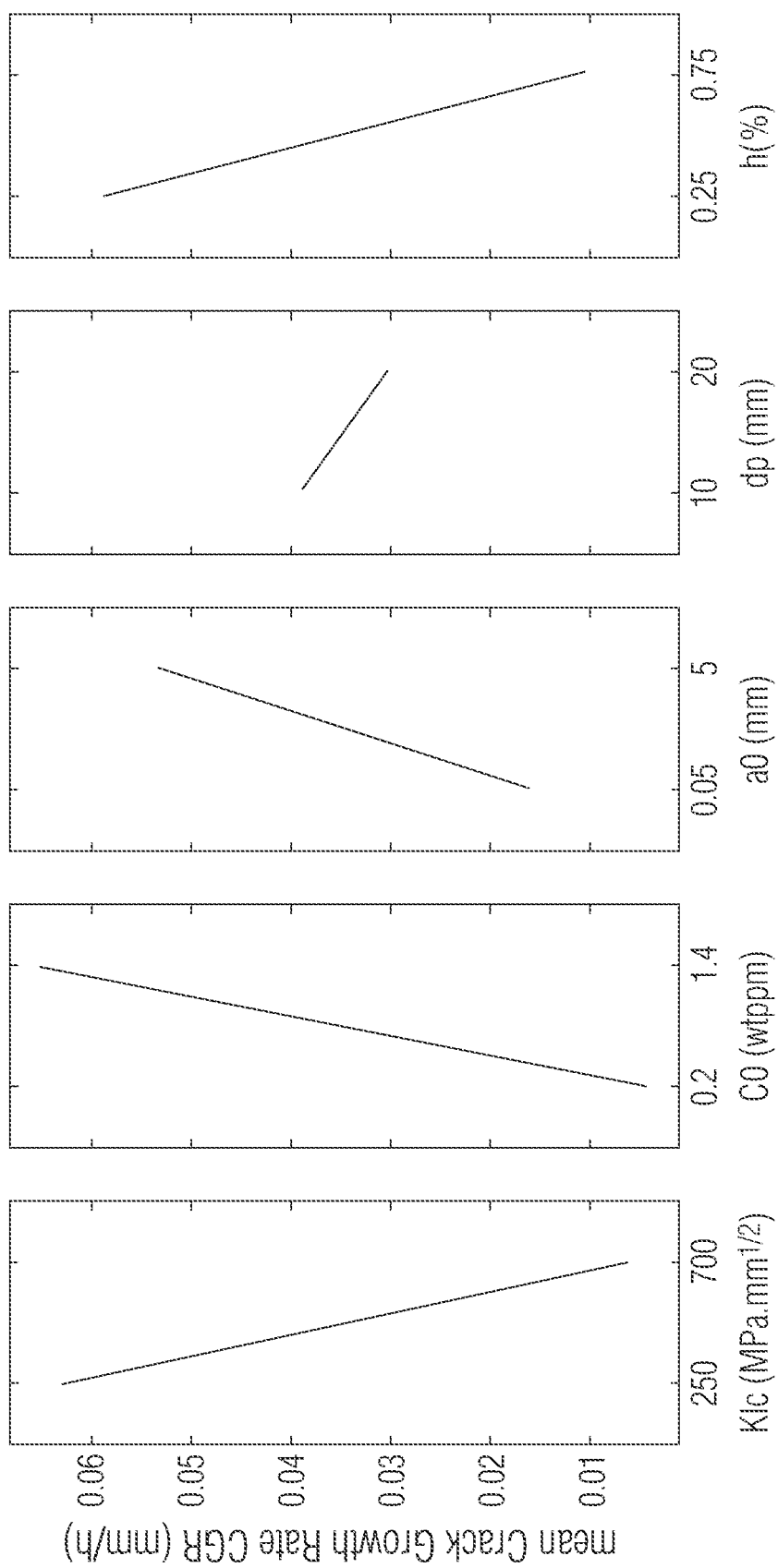
FIG. 10 presents main effect graphical representations of design-of-experiment (DOE) analysis according to an exemplary implementation of the present invention.
Figure 11:
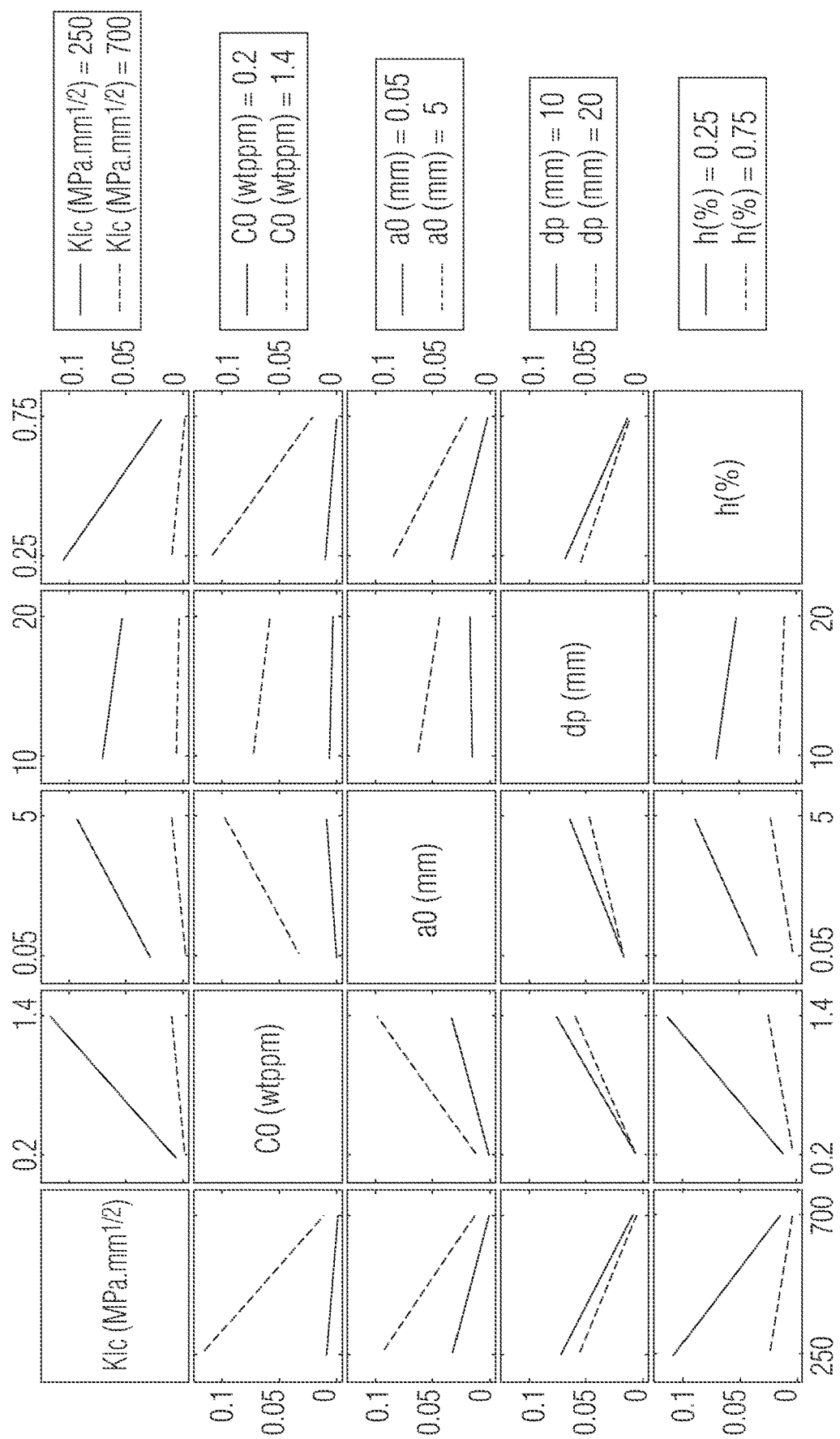
FIG. 11 presents interaction plot graphical representations of design-of-experiment (DOE) analysis according to an exemplary implementation of the present invention.

The results of the DOE analysis for the Crack Growth Rate (CGR) output are shown in FIGS. 10-11. FIG. 10 presents main effect graphical representations of DOE analysis for each model parameter. The graph shows that CGR is strongly positively correlated with the hydrogen charging concentration ($C_0$) and the initial crack size ($a_0$), while it is strongly negatively correlated with the steel fracture toughness ($K_{IC}$) and the crack depth (h %). However, variations in the pipe wall thickness have a very minor effect on the computed CGR. In addition, FIG. 11, which presents interaction plot graphical representations of DOE analysis for each pair of model parameters, shows that the wall thickness has also a very minor effect on co-variations (variation of two parameters at the time). The pipe wall thickness controls mainly for time required for hydrogen to reach the crack cavity and therefore influence the time to growth τ, but still to a lesser extent as compared with the other 4 parameters. As a consequence, a constant mean value can be taken for the wall thickness during the generation of the simulated numerical observation database.

Simulated Observation Database

The main outputs from the DOE analysis required to generate the simulated numerical observation database ("SODB") with minimum computing cost can be summarized as to the following: a constant man value of wall thickness can be reasonably used; 5 levels shall be considered for the fracture toughness and hydrogen charging concentration; and 3 levels for the initial crack size and the crack depth. This results in a total number of 225 simulations (run in about 3.5 days CPU time), needed to build the SODB.

Training and Validation of the Expert System

Two feed-forward artificial neural networks, CGC-ES and INT-ES, have been created and trained on a SODB, according to the method flow in FIG. 7. A CGC-ES neural network consists of 4 nodes at the input layer (one node per model parameter), and two nodes at the output layer (τ and CGR). Additionally, the INT-ES consists also of 4 nodes at the input layer, and only one categorical node at the output layer (used for the categorical variable init). Three hidden layers were chosen between the inputs and outputs for each neural network. The first hidden layer has 16 nodes, the second layer has 8 nodes and the third layer has 2 nodes.

The supervised learning of the neural networks was achieved using the Neural Network (NN) toolbox of MATLAB© software for convenience only, although, it could have been easily solved using any other open source neural network library (for example, OpenANN). The performance of the trained NN were then validated against the FEM model and showed very good reproducibility.

Thus as shown and described herein, the present invention provides technical solutions to technical problems associated with hydrogen-induced cracking measurements and for providing highly effective or efficient predictive capability to determine, for example, crack growth characteristics. The present invention includes a dynamic, self-improving and rapid expert system to predict time to growth and crack growth rate, of pre-existing linear hydrogen-induced cracks (such as linear HIC or blisters). Moreover, the technical structure of the present invention makes deployment in the field possible, in ways that were previously unavailable.

In one or more implementations, a technical solution includes an elimination of special monitoring programs that would have been otherwise required for providing HIC measurements and predictability. This can include, for example, eliminating a need for predetermined local inspection of regions of damaged equipment at periodic intervals, as local inspection can be timed to coordinate with the predicted crack growth rates. Further, the present invention goes far beyond fitness for service assessments that result in binary results (e.g., pass/fail). The present invention can be configured to provide ultrasonic-based mapping, thereby providing for precise and intuitive information for machines.

In addition, the present invention reduces CPU processing time and memory use, at least in part by eliminating convergence issues that would otherwise be prevalent during simulation. This can include, for example, elimination or reduction of hardware/software licenses, computer workstations or the like, as well as significant reduction of time requirements of conventional simulation programs. Further, in one or more implementations, the expert system (e.g., an artificial neural network) is trained and can, thereafter in operation, evolve to a simulation program that is configured to makes predictions, for example, of crack growth characteristics. This provides a technical solution by altering information and functionality in a single aspect of the present invention from data learning, for example, to data operations and ultimately field deployment.

Furthermore, in one or more implementations, design of experiments are executed by one or more processors prior to running parametric simulations, which eliminates less significant variables that would be otherwise used in simulations. For example, mesh quality, solvers and solution convergence issues are handled in advance, during the generation of the database. This results in fewer simulations that would have been necessary to predict HIC, which results in better device performance and operation, less device demand, and lowers costs while simultaneously maintaining and/or improving HIC predictability and/or providing for HIC predictability in ways that were heretofore impossible.

For example, the present invention eliminates a need for expensive licenses and computing device requirements to train and deploy FFM packages, including for a plethora of workstations associated with a conventional three-dimensional Mech-Model solution. As noted herein, such solution would otherwise be required for modeling and predictive measures concerning a cracked portion of a structure having an area of a 500 mm by 500 mm by 30 mm in which multiple cracks are embedded. By eliminating a need for high performance workstations, such as those having dozens of CPUs and gigabytes of memory, the present invention makes not only affordable, but possible at all, the ability to determine a growth rate of hydrogen induced damage in an asset by simulating the growth rate based on one or more data inputs, and predict crack growth. This is effected as a function of non-destructive inspection via supervisory control and data acquisition (SCADA), which is further configured to generate alerts and to transmit the alerts to operator(s) in order that operating pressure is adjusted, automatically.

FIGS. 1 through 11 are conceptual illustrations allowing for an explanation of the present invention. Those of skill in the art should understand that various aspects of the implementations of the present invention could be implemented in hardware, firmware, software, or combinations thereof. In such implementations, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and implemented by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single implementation, as other implementations are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific implementations will so fully reveal the general nature of the invention that others can, by applying knowledge within the skill of the relevant art(s) (including the contents of the documents cited and incorporated by reference herein), readily modify and/or adapt for various applications such specific implementations, without undue experimentation, without departing from the general concept of the present invention. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary implementations, but should be defined only in accordance with the following claims and their equivalents.

What is claimed is:

1. A system for determining a growth rate of hydrogen induced cracking (HIC) damage of an asset, the system comprising:

a computer having a processor, a memory, and an artificial neural network configured to operate as an expert system for determining the growth rate of the HIC damage of the asset, the expert system being trained from a database that stores simulation data corresponding to a plurality of input parameters and to an output parameter corresponding to the growth rate of HIC damage, the simulation data being obtained from running a mechanistic model on values of the plurality of input parameters to obtain corresponding values of the growth rate of HIC damage;

a data gathering device configured to gather input data at a region of the asset, the gathered input data corresponding to one or more of the plurality of input parameters; and wherein the processor is configured to execute instructions that configure the processor to operate the expert system by:

receiving from the data gathering device the input data gathered at the region of the asset;

extracting values of the one or more of the plurality of input parameters from the received input data of the region of the asset;

processing the extracted values of the one or more of the plurality of input parameters through the artificial neural network to output the growth rate of HIC damage at the region of the asset;

deriving a curve of a maximum allowable working pressure ("MAWP") versus time for the region of the asset;

comparing a value of the received input data over time to the curve to determine whether the difference in values of the received input data and the MAWP falls below a threshold;

generating an alert of the region of the asset in response to the determined difference falling below the threshold; and in response to generating the alert, automatically adjusting operating conditions at the region of the asset to increase the difference in values of the received input data and the MAWP above the threshold.

2. The system according to claim 1, wherein the executed instructions further configure the processor to operate the expert system by:

maintaining a HIC map of the region of the asset;

extracting values of other of the plurality of input parameters from the maintained HIC map; and processing the extracted values of the other of the plurality of input parameters through the artificial neural network to output the growth rate of HIC damage at the region of the asset.

3. The system according to claim 2, wherein the executed instructions further configure the processor to operate the expert system by processing the extracted values of the plurality of input parameters to output a new said HIC map of the region of the asset.

4. The system according to claim 3, wherein the executed instructions further configure the processor to operate the expert system by extracting the values of the other of the plurality of input parameters from the new HIC map.

5. The system according to claim 1, wherein the data gathering device is a robot, an intrusive probe system, a non-intrusive probe system, or a patch probe.

6. The system according to claim 1, wherein the plurality of input parameters include crack geometry data, crack location data, material properties data, hydrogen charging data, operating conditions data, or a combination thereof.

7. The system according to claim 1, wherein the value of the received input data is a value of the operating pressure at the region of the asset.

8. The system according to claim 7, wherein the executed instructions further configure the processor to operate the expert system by:

determining a remaining lifetime of the region of the asset using a minimum operating pressure and the derived curve of MAWP versus time;

adjusting the operating pressure at the region of the asset in response to the determined difference falling below the threshold;

scheduling a fitness-for-service inspection at the region of the asset based on the determined remaining lifetime of the region of the asset; and generating an alert in response to the determined remaining lifetime of the region of the asset falling below another threshold.

9. The system according to claim 1, wherein the executed instructions further configure the processor to operate the expert system by scheduling, based on the output growth rate of HIC damage at the region of the asset, a fitness-for-service inspection at the region of the asset.

10. The system according to claim 1, wherein the asset is a steel pipeline, a pressure vessel, a storage tank, or a piping system.

* * * * *